United States Patent
Sadjadpour

(10) Patent No.: US 11,741,268 B2
(45) Date of Patent: Aug. 29, 2023

(54) EXTRA-COMPACT KEY WITH REUSABLE COMMON KEY FOR ENCRYPTION

(71) Applicant: The Regents of the University of California, Oakland, CA (US)

(72) Inventor: Hamid R. Sadjadpour, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 209 days.

(21) Appl. No.: 17/304,294

(22) Filed: Jun. 17, 2021

(65) Prior Publication Data

US 2021/0397749 A1 Dec. 23, 2021

Related U.S. Application Data

(60) Provisional application No. 63/040,281, filed on Jun. 17, 2020.

(51) Int. Cl.
*G06F 21/78* (2013.01)
*H04L 9/08* (2006.01)

(52) U.S. Cl.
CPC .......... *G06F 21/78* (2013.01); *H04L 9/0869* (2013.01); *H04L 2209/08* (2013.01)

(58) Field of Classification Search
None
See application file for complete search history.

(56) References Cited

U.S. PATENT DOCUMENTS

| | | | | |
|---|---|---|---|---|
| 7,752,453 | B2 * | 7/2010 | Stedron | G09C 1/02 380/42 |
| 8,548,171 | B2 * | 10/2013 | McGrew | H04L 9/0891 380/263 |
| 10,289,816 | B1 * | 5/2019 | Malassenet | G06F 21/14 |
| 11,095,442 | B1 * | 8/2021 | Mandich | H04L 9/0662 |
| 11,212,098 | B2 * | 12/2021 | Garcia Morchon | H04L 9/3093 |

(Continued)

FOREIGN PATENT DOCUMENTS

CN 107925577 A * 4/2018 ............. G06F 21/32

OTHER PUBLICATIONS

Davida, George et al., "A speed-up theorem for cryptosystems.", manuscript 2000, pp. 1-8. (Year: 2000).*

(Continued)

*Primary Examiner* — Michael Pyzocha
(74) *Attorney, Agent, or Firm* — Wolter Van Dyke Davis, PLLC; Eugene J. Molinelli

(57) ABSTRACT

Techniques for secure public exposure of digital data include extracting first digital data comprising one or more batches, each batch comprising a plurality of no more than a number T of packets, each packet containing a plurality of a number n of bits. A random binary matrix CK consisting of T rows and n columns is generated. For a first batch, a first random n-bit temporary key is generated and positions of the nT elements of matrix CK are randomized to produce matrix CK(RP). For a packet in the first batch, a first packet vector key is generated based on non-overlapping pairs of bit positions for both the temporary key and for a first packet-corresponding row of matrix CK(RP). An encrypted packet is generated for the packet based on the packet and the first packet vector key. The encrypted packet is exposed publicly.

17 Claims, 7 Drawing Sheets

(56) References Cited

U.S. PATENT DOCUMENTS

| | | | | |
|---|---|---|---|---|
| 11,323,247 | B2* | 5/2022 | Kuang | H04L 9/065 |
| 2003/0091193 | A1* | 5/2003 | Bunimov | H04L 9/065 |
| | | | | 380/278 |
| 2003/0215089 | A1* | 11/2003 | Mihaljevic | H04L 9/0877 |
| | | | | 380/42 |
| 2007/0253548 | A1* | 11/2007 | Kameyama | G06F 21/6218 |
| | | | | 380/37 |
| 2008/0069345 | A1* | 3/2008 | Rubin | H04L 9/0841 |
| | | | | 380/44 |
| 2009/0010428 | A1* | 1/2009 | Delgosha | H04L 9/0844 |
| | | | | 380/30 |
| 2010/0281336 | A1* | 11/2010 | Seurin | H04L 9/0838 |
| | | | | 714/755 |
| 2011/0261954 | A1* | 10/2011 | Lee | H04L 9/065 |
| | | | | 380/28 |
| 2015/0188701 | A1* | 7/2015 | Nordholt | H04L 63/061 |
| | | | | 713/171 |
| 2017/0017936 | A1 | 1/2017 | Bisikalo et al. | |
| 2017/0085379 | A1* | 3/2017 | Mandal | H04L 9/0618 |
| 2017/0331622 | A1* | 11/2017 | Kawai | H04L 9/08 |
| 2019/0132117 | A1* | 5/2019 | Kuang | H04L 9/30 |

OTHER PUBLICATIONS

International Search Report and Written Opinion dated Sep. 23, 2021, in corresponding PCT/US21/70720.
Mohsen Karimzadeh Kiskani, et al.; "Secure and private cloud storage systems with random linear fountain codes"; In Cloud and Big Data Computing (CBDCOM), 2017 International Conference on. IEEE, 2017.
Claude E Shannon, "Communication theory of secrecy systems"; Bell Labs Technical Journal, 28(4):656-715, 1949.
Ueli Maurer, "Conditionally-perfect secrecy and a provably-secure randomized cipher"; Journal of Cryptology, 5(1):53-66, 1992.
Stefan Dziembowski, et al.; "Tight security proofs for the bounded-storage model" In Proceedings of the thirty-fourth annual ACM symposium on Theory of computing, pp. 341-350, May 2002.
C. Cachin, et al.; "Unconditional security against memory-bounded adversaries" In Advances in Cryptography-Crypto, pp. 292-306, 1997.
Theodoros K Dikaliotis, et al.; "Security in distributed storage systems by communicating a logarithmic number of bits"; In Information Theory Proceedings (ISIT), 2010 IEEE International Symposium on, pp. 1948-1952. IEEE, 2010.
Matthieu Bloch, et al.; "Physical-layer security: from information theory to security engineering"; Cambridge University Press, 2011.
G David Forney Jr.; "On the role of MMSE estimation in approaching the information-theoretic limits of linear Gaussian channels: Shannon meets wiener" arXiv preprint cs/0409053, 2004.
Yevgeniy Dodis; "Shannon impossibility revisited" In International Conference on Information Theoretic Security, pp. 100-110, Berlin, Heidelberg, 2012.
Alexandros G Dimakis, et al.; "Network coding for distributed storage systems" IEEE Transactions on Information Theory, 56(9):4539-4551, 2010.
Sameer Pawar, et al.; "On secure distributed data storage under repair dynamics" In Information Theory Proceedings (ISIT), 2010 IEEE International Symposium on, pp. 2543-2547. IEEE, 2010.
Sameer Pawar, et al.; "Securing dynamic distributed storage systems against eavesdropping and adversarial attacks" IEEE Transactions on Information Theory, 57(10):6734-6753, 2011.
Willie K Harrison, et al.; "Physical-layer security: Combining error control coding and cryptography"; In Communications, 2009. ICC'09. IEEE International Conference on, pp. 1-5. IEEE, 2009.
Nihar B Shah, et al.; Information-theoretically secure regenerating codes for distributed storage. In Global Telecommunications Conference (GLOBECOM 2011), 2011 IEEE, pp. 1-5. IEEE, 2011.
Ankit Singh Rawat, et al.; "Optimal locally repairable and secure codes for distributed storage systems" IEEE Transactions on Information Theory, 60(1):212-236, 2014.
Swanand Kadhe, et al.; Weakly secure regenerating codes for distributed storage. In Network Coding (NetCod), 2014 International Symposium on, pp. 1-6. IEEE, 2014.
Siddhartha Kumar, et al.; "Secure repairable fountain codes"; IEEE Communications Letters, 20(8):1491-1494, 2016.
Muxi Yan, et al.; "Weakly secure data exchange with generalized reed solomon codes"; In Information Theory (ISIT), 2014 IEEE International Symposium on, pp. 1366-1370. IEEE, 2014.
Kapil Bhattad, et al.; "Weakly secure network coding"; NetCod, Apr. 104, 2005.
Mohsen Karimzadeh Kiskani, et al.; "A Secure Approach for Caching Contents in Wireless Ad Hoc Networks"; IEEE Transactions on Vehicular Technology, 66(11):10249-10258, 2017.
Mohsen Karimzadeh Kiskani, et al.; :Throughput analysis of decentralized coded content caching in cellular networks, IEEE Transactions on Wireless Communications, 16(1):663-672, 2017.

\* cited by examiner

US 11,741,268 B2

EXTRA-COMPACT KEY WITH REUSABLE COMMON KEY FOR ENCRYPTION

BACKGROUND

Claude Shannon introduced a cipher system in [1] which achieves perfect secrecy. The notion of perfect secrecy in Shannon's work means that no eavesdropper can deduce any information about the transmitted message regardless of its computational power. He studied the fundamental communication requirements that are necessary and sufficient to guarantee that "Alice" can send messages to "Bob" in a way that "Eve" cannot obtain any information about the transmitted messages. Shannon proved that if Alice uses a different key, selected uniformly at random from the set of all keys for each message, then perfect secrecy is achievable. This communication channel has been studied extensively since then and is the basis for sensitive communication systems including the one-time-pad (or Vernam pad) system used for communications between Moscow and Washington, D.C. during the cold war. However, the downside of this system is the size of the key which should be as large as the size of the message to guarantee secure communications.

SUMMARY

Techniques are provided for using an extra-compact key for encryption of data for public exposure, such as cloud storage, that provides a substantially higher level of security, including perfect security in some embodiments, with substantially smaller keys than in previous approaches, or some combination.

In a first set of embodiments, a method implemented on a hardware processor provides secure public digital storage. The method includes, in step a, extracting first digital data comprising one or more batches. Each batch includes no more than a number T of packets (T>1); and, each packet contains a number n of bits (n>1). The method also includes, in step b, generating a random binary matrix CK consisting of T rows and n columns. For a first batch, in step c, a first random n-bit temporary key is generated and positions of the nT elements of matrix CK are randomized to produce randomized matrix CK(RP). Further, the method includes, in step d, for each packet in the first batch, generating a packet vector key based on non-overlapping pairs of bit positions for both the temporary key and for a row of randomized matrix CK(RP) which corresponds to the number of the packet in the batch. Still further, the method step d includes generating an encrypted packet for the packet based on the packet and the packet vector key. Even further yet, the method step d includes exposing the encrypted packet publicly.

In some of embodiments of the first set, the method includes repeating steps c and d for all batches of the one or more batches in one or more iterations m while batches remain for remote digital storage, wherein for an initial iteration m=0, $T_0$=T and $CK_0$=CK. While batches remain after $L_m$ batches for which practical security is maintained, the method includes: increasing $T_m$ to $T_{m+1} > T_m$; expanding $CK_m$ to $CK_{m+1}$ with $T_{m+1}$ rows; and repeating steps c and d for up to a next $L_{m+1}$ batches for which adequate security is maintained. $T_{m+1}$ is based on $T_m$ and $L_m$. $L_{m+1}$ is based on $T_{m+1}$, and $L_{m'1} > L_m$. $CK_{m+1}$ is deterministically based on previous iterations of CK so that a stored extra-compact key need not include the $CK_m$ for non-zero m.

In other sets of embodiments, a computer readable medium, or apparatus, or system is configured to perform one or more steps of the above method or to store or decode the encoded data produced by the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
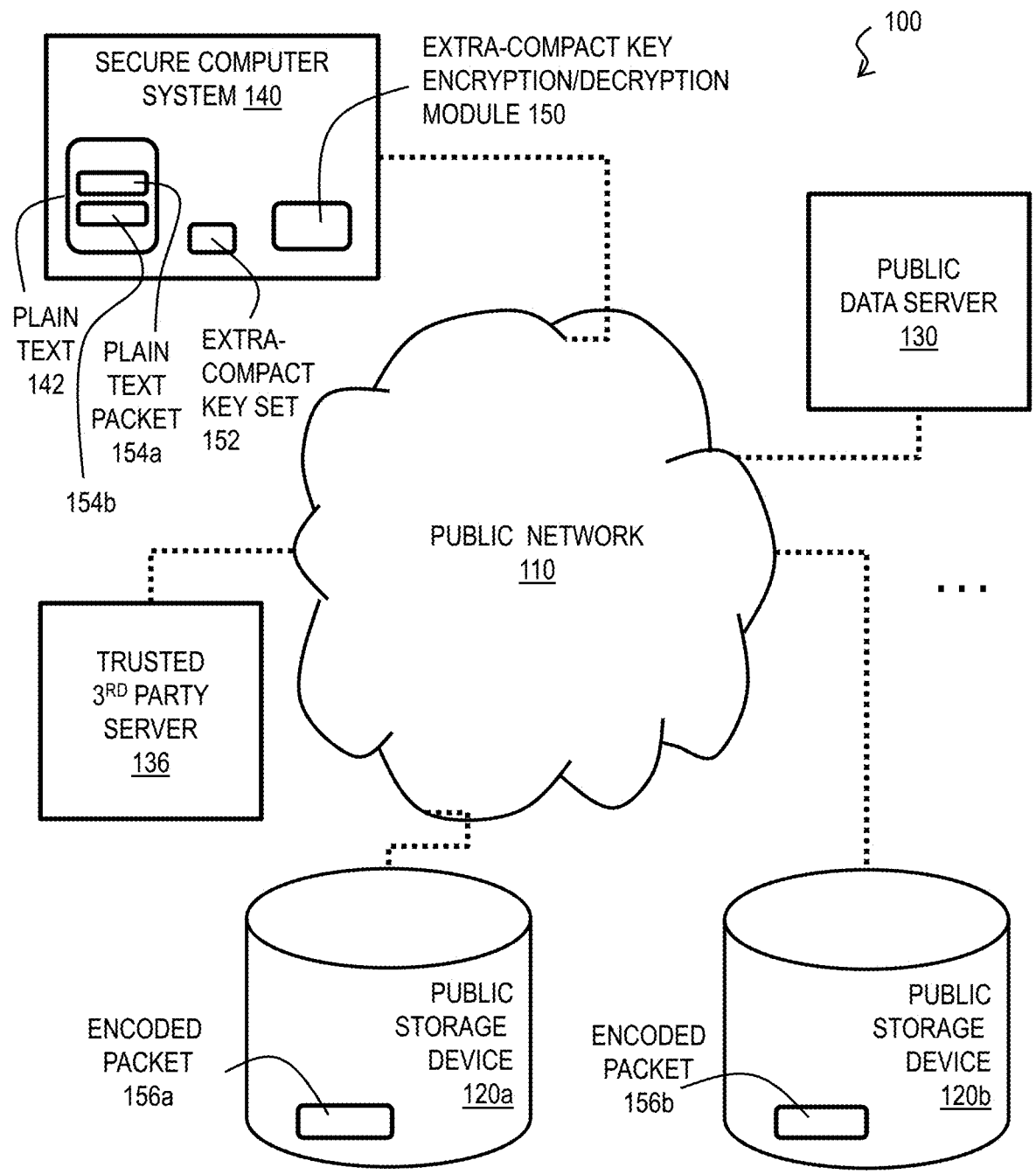
FIG. 1 is a block diagram that illustrates an example system for producing encoded data that is exposed to the public with complete secrecy and a extra-compact key, according to an embodiment.

A method, computer readable medium, apparatus and system are described for extra-compact key encoding of data for public exposure, such as in cloud storage. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of public cloud-based data storage, e.g., data storage on a network that is at least in part exposed to public access. However, the invention is not limited to this context. In other embodiments the encoding is used in communications, such as over wireless cellular and ad hoc networks, with a trusted partner for whom a perfectly secure channel is available for delivering the extra-compact key or plaintext or some combination.

1. Description of Problem

In the classical Shannon problem, Alice uses a random coding mechanism to achieve perfect secrecy by encoding a message with a unique key that is selected uniformly at random from the set of all keys. The number of keys is at least as large as the number of messages. Bob also gets the same set of keys and uses them for decoding. Eve does not have these keys and cannot decode. In this scheme, if Alice wants to achieve perfect secrecy for data transmission, she needs to transmit all random keys to Bob and Bob needs to store them for data decryption. Since the size of key bits is as large as the size of message bits, using Shannon cipher for many applications including distributed cloud storage systems is not practical.

The communication model in distributed cloud storage systems is different from traditional communication model discussed by Shannon in [1]. In a cloud storage model, Alice wants to store some data on the cloud and retrieves them later. In other words, Bob is the same as Alice; but, the retrieval is performed at a later time. Alice intends to prevent Eve from obtaining any information about the stored contents in the cloud.

If Alice wants to achieve perfect secrecy similar to the traditional Shannon cipher system, she needs to locally and securely store a separate key for each message that she stores on the cloud and then use that key to retrieve the message from the stored cipher-text. Therefore, she will need the same size of local storage to store securely the keys. This clearly does not benefit from the advantage of offsite massive storage offered by cloud storage; and, thus, is not a practical way to use cloud storage systems. Even assuming that Alice has such a storage capability, Alice would be better off not to store any data on the cloud; but, instead to store the plaintext files locally instead of the keys! Therefore, Shannon's scheme does not work for cloud storage systems in practice.

Using codes like Maximum Distance Separable (MDS) is very common in storage systems [2] due to their repair capabilities. However, certain requirements are needed to secure the applications that use these codes. Authors in [10] studied the security of distributed storage systems with MDS codes. Pawar et al. [11] studied the secrecy capacity of MDS codes. The authors in [12], [13] also proposed security measures for MDS coded storage systems. Shah et al. [14] proposed information-theoretic secure regenerating codes for distributed storage systems. Rawat et al. [15] used Gabidulin codes together with MDS codes to propose optimal locally repairable and secure codes for distributed storage systems. All these references [9]-[16] used an existing forward error correction code and by modifying it, they provided security for distributed storage systems.

Kumar et al. [17] have proposed a construction for repairable and secure fountain codes. This reference [17] achieves security by concatenating Gabidulin codes with Repairable Fountain Codes (RFC). Their specific design allows one to use Locally Repairable Fountain Codes (LRFC) for secure repair of the lost data. Unlike [17] which has focused on the security of the repair links using concatenated codes, the novel methods described below provide security for the data storage by only using a novel code design that can achieve perfect secrecy with minimal key size.

Network coding schemes have been shown to be very efficient from a security point of view. Cai and Young [18] showed that network coding can be used to achieve perfect secrecy when network encoded files are sent through multiple paths and only one of the paths is compromised. Bhattad et al. [19] studied the problem of "weakly secure" network coding schemes in which even without perfect secrecy, no meaningful information can be extracted from the network during transfer of data. Subsequent to [19], Kadhe et al. studied the problem of weakly secure storage systems in 20], [21]. Yan et al. also proposed [22], [23] algorithms to achieve weak security and also studied weakly secure data exchange with generalized Reed Solomon codes. In contrast, the novel method described below designed for cloud storage systems, encode the messages by combining them with each other to create the ciphertext. Hence, the ciphertext will not be independent of the message and the Shannon criteria may not be valid. Therefore, it might be intuitive to think that these codes can only achieve weak security as opposed to perfect security. However, it is shown in subsequent sections that the unique code construction described below results in perfect secrecy. It is even shown that the unique code construction described below can efficiently reduce the required key size to achieve such perfect secrecy.

Recently, there has been a lot of interest in studying methods of achieving physical layer security through the use of coding techniques [24]. The authors in [25] have proposed a new scheme to use error control codes for cryptography purposes. In [26], the authors provided physical layer security with a special code design. The authors in [27]-[30] studied different methods for achieving asymptotic perfect secrecy using coding techniques. In [27], they proposed a method for achieving asymptotic perfect secrecy in wireless networks using random coding of cached contents. This method is then extended to include secure content update in [29]. In [30], they proposed new coding schemes which are able to provide asymptotic perfect secrecy and privacy at the same time. Note that these works also relied on specific known forward error correction code. In all prior work in literature, asymptotic perfect secrecy was achieved which required the use of infinite size data in order to achieve perfect secrecy. Clearly, this is not a practical solution for perfect security.

There are other efforts to achieve perfect secrecy asymptotically. For example, the authors in [6] introduced the concept of codes for security without any error correction capability. This was accomplished by using sparse vectors to achieve asymptotic perfect secrecy in cloud storage systems. The proposed method in [6] significantly outperforms Advanced Encryption Standard (AES) in terms of computational complexity while providing asymptotic perfect secrecy. That coding scheme [6] has the unique ability of providing asymptotic perfect secrecy with low decoding complexity. The new code for security introduced in [6] still suffered from the problem of achieving perfect secrecy asymptotically which does not make this technique completely secure.

In the inventor's previous work [31] an extra-compact key was used to achieve perfect security with finite size by encoding the data with an additional random bit at a random location. Here efficient encryption is achieved without encoding an additional bit.

The closest work in this area was based on the bounded storage model concept in [2]-[5] and many other works that followed. The ground-breaking work was first introduced by Maurer in [2]. Maurer introduced the creation of a random bit string that is publicly available to both legitimate users and eavesdroppers. However, the bounded-storage eavesdroppers can only access a fraction of the random bit string. Cachin and Maurer [4] introduced a more general bounded-storage assumption by taking advantage of a complicated privacy amplification technique and Renyi entropy considerations. Ding and Rabin [5] presented two protocols that are provably secure against any adversary in this bounded-storage model. All these works assume that the eavesdropper has unbounded computational complexity. They use small secret key size to generate significantly larger key bits with the help of the random bit string. However, if the eavesdropper has enough storage capability, these approaches fail. Further, the cipher introduced in [2] is proven to be perfectly secure with high probability. Besides, it is also unlikely to be able to build a device that can generate such a large uniform random bit string that is required for this technique.

The techniques described here do not require any restriction on the eavesdropper storage size or computational capability and are perfectly secure with probability one. In these techniques, both the user and the eavesdropper are assumed to have unlimited storage and computational complexity capabilities.

2. Overview of Solution

In the techniques developed here, an answer was sought to the following question. Is it possible to leverage the unity of Alice and Bob in the cloud storage model to achieve perfect secrecy in practice or to rely on storage of a very small amount of local data for keys, or some combination? A solution is presented in which perfect secrecy in clouds can be achieved with much smaller key size than the file size and without inserting a random bit at any position, as in [31].

As opposed to [6], these techniques focus on achieving perfect secrecy instead of merely asymptotic perfect secrecy (achieving perfect secrecy asymptotically as the key size increases). Further, code design is of interest, which can achieve perfect secrecy with minimal key size. As mentioned in the introduction, using Shannon cipher for cloud storage systems does not seem practical due to the need for large key storage. Here is presented a solution to overcome this issue. These techniques provide a practical scheme to achieve perfect secrecy with minimal required key storage overhead. This focus on practical aspects of code design makes it suited for use in distributed cloud storage systems, among other applications.

Security for a new class of applications is defined as follows. Assume an organization wants to store their sensitive data into the public cloud storage systems such that even the cloud storage provider is unable to retrieve the data now or in the future with the advances in computations. Under this assumption, we no longer have the traditional sender and receiver that are trying to exchange and share keys in order to securely transmit encrypted data. Instead, the sender stores the encrypted data in the cloud storage systems without providing the keys to the service provider. In this new paradigm, any organization using this technique will secure the secret keys instead of the entire information (data) using significantly smaller size storage. Further, the sender requires the encrypted data to be information-theoretically secure by using perfect secrecy technique also known as one-time pad.

A new concept called local perfect secrecy is also introduced. Both the sender and the eavesdropper have unlimited computational complexity and storage capability. There is no restriction on the ability of the eavesdropper to use any operation that requires infinitely large computations or memory. Our approach provides a perfect secrecy solution for all the encrypted data that are stored in each server (machine) in the cloud and also allows the ratio of the key bits to information bits tends to zero.

FIG. 1 is a block diagram that illustrates an example system 100 for producing encoded data that is exposed to the public with complete secrecy and an extra-compact key, according to an embodiment. A public network 110 is used to communicate data among various nodes on the network, such as one or more public data servers, e.g., server 130, and one or more public storage devices, e.g., devices 120a and 120b, collectively referenced hereinafter as public storage devices 120. On a secure computer system 140, resides some plaintext data 142 that is to be kept secret from public access. In an approach described in more detail below, an extra-compact key encoding/decoding module 150 executes on system 140 to define an extra-compact key 152 and successively encode a group of up to a number T of plain text packets (T>1), e.g., packets 154a and 154b, collectively referenced hereinafter as a group of plaintext packets 154 of the plaintext data 142. In some embodiments, Tis about 100; in various embodiments, T is selected to be in a range from about 2 to about 10, from about 10 to about 100, or from about 100 to about 1000. The encrypted packets, 156a and 156b, respectively, are ciphertext that can be safely exposed to the public, such as being communicated over public network 110 or stored in one or more public storage devices 120, without divulging the plaintext packets 154. In a distributed cloud storage system, the two encrypted packets 156a and 156b are stored on different public storage devices 120a and 120b, respectively. A characteristic and advantage of the system 100 is that the size of the extra-compact key 152 is much less than the size of the plaintext data 142 being encoded as packets 156. After public storage of encrypted packets 156 and secure storage of the extra-compact key set 152, the plaintext 142 or packets 154 can be removed from the local machine such as computer system 140.

In some embodiments, the module 150 and extra-compact key set 152 or both reside on another device, such as public data server 130 or trusted third party server 136. In such embodiments, there is a secure channel between the secure computer system 140 and the public data server 130 or the trusted $3^{rd}$ party server 136, such as a virtual private network (VPN), and the public data server or 3$^{rd}$ party server 136 is trusted to keep secure the plaintext data 142 and the extra-compact key set 152. In such embodiments, the plaintext 142 or plaintext packets 154 are transmitted securely to the public data server 130 or trusted 3$^{rd}$ party server 136, where the module 150 is executed to use or generate the extra-compact key set to produce the encrypted packets 156, and store those packets 156 on one or more public storage devices 120.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, in some embodiments, two or more encrypted packets 156, such as a group of T packets encoded together, are stored on the same public storage device 120. In some embodiments, each of one or more of the secure computer system 140 or public data server 130 or public storage device 120 is a computer system as described below in reference to FIG. 4, or a chip set as described below in reference to FIG. 5, or a mobile terminal, such as a tablet or cell phone, as described below in reference to FIG. 6, or some combination.

As described in the following sections, perfect security can be achieved with the encoding scheme presented here. In contrast, Shannon perfect secrecy, also known as one-time pad, can only be achieved by using exactly a different key bit for each information bit. This requirement makes the implementation of perfect secrecy impractical in most applications. As described below, a novel coding scheme for security achieves perfect secrecy with only a fraction of the bits in the plaintext (where T is the number of packets using one temporary key), regardless of the size of the packet. The coding scheme has been applied to distributed cloud storage systems. Further, optimal code for security is defined and it has been shown that the proposed approach is optimal.

3. Method for Encryption

Figure 2A:
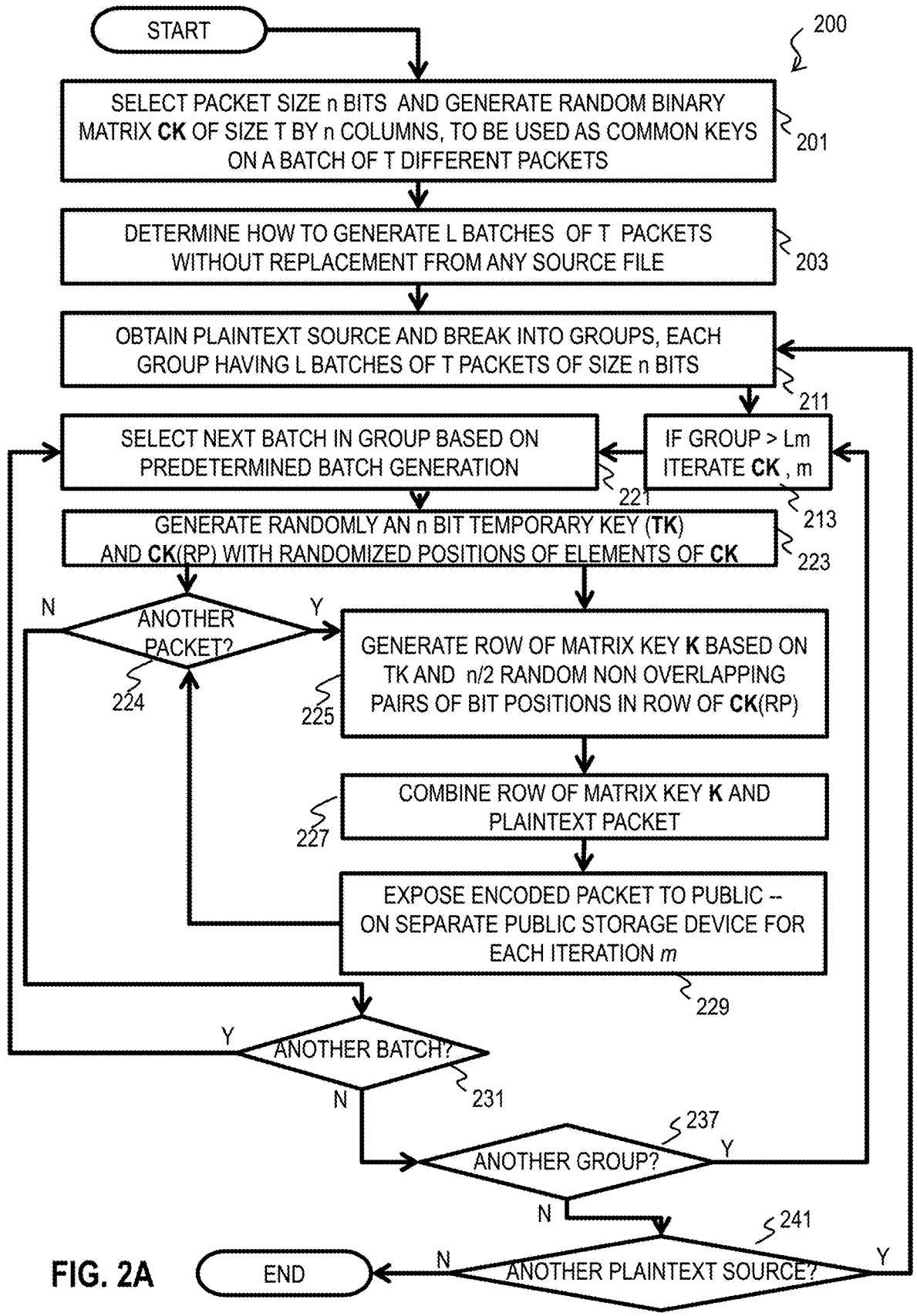
FIG. 2A is a flow diagram that illustrates an example method for producing encoded data with an extra-compact key, according to an embodiment.

FIG. 2A is a flow diagram that illustrates an example method 200 for producing encoded data with an extra-compact key, according to an embodiment. An advantage of this method is perfect or near perfect secrecy without increasing the size of the plaintext. Although steps are depicted in FIG. 2A as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, a number n of bits is selected as a size for a packet 154. Because the number of bits encoded per operation is a function of packet size, there is incentive to make packet size n large, and there is no limit on how large n can be. There is no need for n to be a power of two; but, in some embodiments it is advantageous for n to be a power of two. A practical range for n is about 4 to about 10,000, with many embodiments using n in a range from about 10 to about 1000 (e.g., 8 to 1024 when a power of two is advantageous). A number T of packets 154 encoded together form a batch of size T packets—or Tn bits. Because the number of bits encoded per operation is a function of batch size, there is incentive to make batch size T large, and there is no limit on how large T can be. There is no need for T to be a power of two; but, in some embodiments it is advantageous for T to be a power of two. A practical range for T is about 4 to about 10,000, with many embodiments using T in a range from about 10 to about 1000 (e.g., 8 to 1024 when a power of two is advantageous). The packets of one batch are expressed by Equation 1a through Equation 1b.

$$Pi=[p_i^1, p_i^2, \ldots, p_i^n] \quad (1a)$$

$$i=1, \ldots, T \quad (1b)$$

where n is the number of bits in one packet, and $p_i^j$=jth bit of packet i, where j=1, ..., n. A batch $\mathcal{P}$ of T packets of equal size, described by expression 1c, are selected to be encrypted in a nested process.

$$\mathcal{P} = \{P_1, P_2, \ldots P_T\} \quad (1c)$$

A random binary matrix called a common key CK of size T rows by n columns is generated to provide a set of common keys to use in the process. Each row of this matrix CK is unique, has a uniform distribution for the probability of zeros and ones, and is statistically independent from other rows and from the data to be encrypted.

The process is repeated until all the original plaintext file or files have been encrypted. The number of batches that are used to encode an original plaintext file or files 142 of size Z bits is then Z/(Tn) rounded up to the next integer. However, the number L of batches that form one group that uses the same common key may be larger or smaller than Z/(Tn), depending on the degree of security desired, as described in more detail below. Security considerations limit the size L for one group using the same common key. Multiple different groups can be encoded or decoded using the same techniques, using the same or a different common key CK.

The element of matrix CK in the jth row and ith column is represented by $a_{(j-1)n+i}$. The entire matrix CK is represented by Equation 2.

$$CK = \begin{bmatrix} a_1, a_2, \ldots, a_n \\ a_{n+1}, a_{n+2}, \ldots, a_{2n} \\ a_{2n+1}, a_{2n+2}, \ldots, a_{3n} \\ \ldots \\ a_{(T-1)n+1}, a_{(T-1)n+2}, \ldots, a_{Tn} \end{bmatrix} \quad (2)$$

The matrix CK is generated during step 201.

In step 203, an algorithm is adopted to generate L batches with or without replacement from any set of one or more files to be encrypted. Without replacement is preferred to prevent the encrypted file from being larger than the original files. For example, in some embodiments, the set of one or more files are sampled successively in batches of Tn bits. In another example, the value of L is determined and every Lth digit starting at digit 1 is assigned to a first batch, and every Lth digit starting at digit 2 is assigned to a second batch, and every Lth digit starting at digit 3 is assigned to a third batch, and so on until L batches have been formed.

In step 211, a source of plaintext is obtained and broken up into one or more groups, each group including L batches, each batch including T packets of n bits. Any method may be used to obtain the plaintext, including receiving manual or automatic input that indicates one or more files or database stored locally or remotely, or receiving data packets according to one or more protocols for packet transmission over a local or private or public network, either unsolicited or in response to a query message.

In step 213, the first or next group is selected. In step 221, the next batch in the current group is selected based on the algorithm for generating L batches for a source file developed in step 203. In some embodiments, a given common key CK is preferably used only a predetermined maximum number of times, indicated $L_0$, e.g., based on the size of n and T to guarantee secrecy, as described in more detail below. Using the temporary keys and reusing common keys CK just $L_0$ times, $L_0$ keys K are generated of the same size as CK, designated $CK_0$. Then these $L_0$ keys K are concatenated to create a new common key $CL_1$. Thus, the original common key $CK_0$ is modified, in some embodiments. In some embodiments, a particular process to deterministically increment T from an original value $T_0$ to an incremented value $T_1$ and to expand $CK_0$ to $CK_1$ with $T_1$ rows is employed; and, described in more detail below. Because $T_1$ is expanded, the predetermined number of times it can be used is also expanded to $L_1$. The process is repeated every time the group number l exceeds the current value of the predetermined maximum value for L using the previous common key CK, indicated by the subscript m. Because the expansion of CK is deterministic, the size of the stored key is still $CK_0$ and does not expand, only new temporary keys are used along with random pairing, thus it is called extra-compact. Thus, more data can be encrypted without increasing the size of the common key CK that must be stored. In addition, because the expanded CK depends on the previous CKs, it is advantageous for the encrypted packets from each expansion be stored on a different data storage device, as indicated in step 229 below, explained in more detail in a later section.

In step 223, for the current batch selected in step 221, an n-bit random temporary key $\mathcal{TK}$ is generated uniformly at random from the set of all n-bit strings. This key is statistically independent of the packets to be encrypted and of the common key, i.e., the rows in matrix CK. The temporary key $\mathcal{TK}$ is only generated once for each batch of T packets, but is used to produce a unique vector key for each packet in the batch, as described below for step 225. The element of temporary key $\mathcal{TK}$ in the jth column is represented by $tk^j$, so the full temporary key is expressed by Equation 3.

$$\mathcal{TK} = [tk^1, tk^2, \ldots tk^n] \quad (3)$$

In step 224, it is determined whether there is another packet in the batch not yet encrypted, including the first packet. If so, control passes to step 225 and following steps to generate and apply a vector key for the packet. If not, control passes to step 231 described below to determine whether there is another batch in the group to be encrypted.

In step 225, a packet specific vector key $K_j$ for the ith packet is generated based on randomly selected pairs of bit positions used to select bits in the temporary key and in the matrix CK of common keys. Thus, step 225 includes generating a first packet vector key based on random non-overlapping pairs of bit positions for both the temporary key and for a first packet-corresponding row of matrix CK. The non-overlapping pairs of bit positions are stored with the extra-compact key e.g., in the extra-compact key set 152. The vector key $K_j$ represented in Equation 4a has elements to be applied to the ith column of the jth packet, as represented by $k_{(j-1)n+i}$.

$$K_j = [k_{(j-1)n+1}, k_{(j-1)n+2}, \ldots, k_{jn}] \quad (4a)$$

The final key is a matrix K of the T vector keys. The entire matrix K is represented by Equation 4b.

$$K = \begin{bmatrix} K_1 \\ K_2 \\ K_3 \\ \ldots \\ K_T \end{bmatrix} = \begin{bmatrix} k_1, k_2, \ldots, k_n \\ k_{n+1}, k_{n+2}, \ldots, k_{2n} \\ k_{2n+1}, k_{2n+2}, \ldots, k_{3n} \\ \ldots \\ k_{(T-1)n+1}, k_{(T-1)n+2}, \ldots, k_{Tn} \end{bmatrix} \quad (4b)$$

For extra-compact keys, bit positions (numbers in the range 1 to nT) are randomly paired for every position (e.g., every number in the range 1 to nT). Without loss of generality, it is assumed that n is even. Therefore, there are nT/2 pairs that are non-overlapping; and, the union of them provides all numbers in the range from 1 to nT, inclusive. Essentially the common key CK is re-arranged before being combined with the temporary key to form the final key for each batch. The previously used indices i=1, . . . , n and j=1, . . . , T are replaced by a randomized index, $q_r$, where for an odd value of r, $q_r$ indicates a first index of a for the random pair and for the next even value of r, $q_r$ indicates a second index of a for the random pair. Table 1, shows example random pairs indicated by even and odd subscripts (r) for a case where n=4 and T=5, so that the indices of a vary from 1 to 20.

TABLE 1

Example randomized pairs indicated by randomized index $q_r$, where r = 1, ..., nT

| $q_r$ | Index of α |
|---|---|
| $q_1$ | 19 |
| $q_2$ | 3 |
| $q_3$ | 13 |
| $q_4$ | 1 |
| $q_5$ | 10 |
| $q_6$ | 20 |
| $q_7$ | 15 |
| $q_8$ | 17 |
| $q_9$ | 11 |
| $q_{10}$ | 2 |
| $q_{11}$ | 14 |
| $q_{12}$ | 7 |
| $q_{13}$ | 9 |
| $q_{14}$ | 8 |
| $q_{15}$ | 5 |
| $q_{16}$ | 18 |
| $q_{17}$ | 6 |
| $q_{18}$ | 16 |
| $q_{19}$ | 12 |
| $q_{20}$ | 4 |

The first random pair is $\{aq_1(=a_{19}), aq_2(=a_3)\}$, the second random pair is $\{a_{13}, a_1\}$. This pairing is used to provide components for the computation described below with reference to Equations 5a through 5e. In general, the random pairing $\mathcal{RP}$ is applied to the common key CK to give the re-ordered common key given by Equation 4c.

$$CK(RP) = \begin{bmatrix} a_{q_1}, a_{q_2}, \ldots, a_{q_n} \\ a_{q_{n+1}}, a_{q_{n+2}}, \ldots, a_{q_{2n}} \\ a_{q_{2n+1}}, a_{q_{2n+2}}, \ldots, a_{q_{3n}} \\ \ldots \\ a_{q_{(T-1)n+1}}, a_{q_{(T-1)n+2}}, \ldots, a_{q_{Tn}} \end{bmatrix} \quad (4c)$$

Each row of the matrix CK(RP) is combined with the temporary key using the rule described next. In some embodiments, CK(RP) is determined during step 223, and is used row by row as follows during step 225.

Assume one pair has elements of j1 and j2 where $1 \leq j1, j2 \leq nT$. It is also assumed that j1 and j2 are the successive $q_r$ and $q_{r+1}$ elements of the same row in CK(RP). In other embodiments, other pairs of elements in the same row may be used as a pair, e.g., first and last, second and second to last, etc. In an illustrated embodiment, the elements k of the vector key are determined as given by Equations 5a through 5e.

$$\gamma_{j1} = a_{j1} \oplus tk^r \quad (5a)$$

$$\gamma_{j2} = a_{j2} \oplus tk^{r+1} \quad (5b)$$

$$\gamma_2 = a_{j1} \oplus tk^{r+1} \quad (5c)$$

$$\gamma_1 = a_{j2} \oplus tk^r \quad (5d)$$

$$k_{j1}, k_{j2} = \begin{cases} \gamma_{j1}, \gamma_{j2} & \text{if } \gamma_2 = 0, \gamma_1 = 0 \\ \gamma_{j2}, \gamma_{j1} & \text{if } \gamma_2 = 0, \gamma_1 = 1 \\ \gamma_{j1}, \neg \gamma_{j2} & \text{if } \gamma_2 = 1, \gamma_1 = 0 \\ \neg \gamma_{j2}, \gamma_{j1} & \text{if } \gamma_2 = 1, \gamma_1 = 1 \end{cases} \quad (5e)$$

Where $\oplus$ indicates an exclusive OR (XOR) operator and $\neg \gamma_{j2} = 1 - j_2$. In other embodiments, the XOR operations performed on the various pair elements are associated with different conditions or different order of the conditions indicated after the "if".

In step 227, an encrypted packet $\mathcal{F}i$ is generated by performing the exclusive OR with each row of the matrix key K, as expressed in Equation 6.

$$\mathcal{F}i = = K_i \oplus P_i \quad (6)$$

These operations have the effect that both the value of final key bits k and their locations are random with respect to the common keys. The final keys $K_i$ have uniform distribution and, as long as the temporary and common keys are not revealed to the eavesdropper, the final keys will remain unknown to the eavesdropper.

In step 229, this encrypted packet is then safely exposed to the public, such as storing the encrypted packet in distributed cloud storage, without revealing the information in the plaintext. For example, the encrypted packet is stored on public storage device 120a. In embodiments that expand $CK_m$ with each iteration m, it is advantageous to store packets computed by different iterations m on different storage devices 120.

In step 231, it is determined whether there is another batch of packets in the group to process. If so, control passes back to step 221 to select the next batch of packets in the group. Otherwise control passes to step 237.

To retrieve the information in the plaintext, this encrypted packet is used in combination with multiple encrypted packets for the same batch. For each batch there are up to T such encrypted packets, e.g., stored on the same or different public storage devices 120. The T encrypted packets can be used with the extra-compact key set to reconstruct the original plaintext for the group.

In step 237, it is determined if there is another group of batches in the original plaintext source to encode or encrypt. If so, then control passes back to step 213 to select the next group. If not, then the entire original plaintext source has been encoded; and, control passes to step 241.

In step 241, it is determined if there is another plaintext source to encode. If so, then control passes back to step 211 to obtain the next plaintext file; and break it up into a new set of groups and batches. If not, then all plaintext sources have been encoded; and, the process ends.

In some embodiments, the encrypted packets are not exposed to public devices in step 229 until several or all of the encrypted packets for the current batch, or for one or more groups, are produced. Thus, in various embodiments, step 229 is moved to occur after step 231 and before step 237, or to after step 237 and before step 241, or to after step 241.

For decoding, one or more of the T encrypted packets produced in the loop of steps 221 to 231 are retrieved. For example, the ith encrypted packet is retrieved. The ith vector key is generated based on stored values in the extra-compact key set for CK, $\mathcal{TK}$, and the packet specific random pairing of bit positions. The random pairing bit position are generated using other common keys being generated in parallel. The newly generated vector key is then used in Equation 7.

$$P_i = K_i \oplus \mathcal{F}i \quad (7)$$

4. Size of Extra-Compact Key

The amount of storage for the extra-compact key set in the above method compares favorably with that of Shannon. Shannon one-time pad approach requires one unique key of equal size to each packet in order to achieve perfect secrecy. This section determines the storage requirement for the proposed technique and comparing it with that of Shannon. Unlike Shannon approach, the proposed technique uses two types of keys to generate the final key and one of these keys is used for many groups of files. Each batch includes T packets, each one containing n bits. Assume the common keys are used L times for L batches. Clearly, L is a finite number and at some point, a new matrix CK of common keys is generated in order to assure that each final key is only used once. However, L can be made a very large number by iteratively increasing T as will be shown later. The total number of common key bits is equal to Tn. Each temporary key has n bits and for L batches of files, a total of Ln bits. Therefore, the total number of common and temporary key bits that are used to encrypt L batches of packets in the proposed algorithm is equal to Tn+Ln. In Shannon approach, the total number of key bits is equal to LTn. The ratio of these two values is given by Equation 8.

$$R = \frac{T \times n + L \times n}{L \times T \times n} = \frac{T + L}{L \times T} \quad (8)$$

To avoid repeating a final key, and, thus, to achieve a desired level of secrecy, it turns out to be a challenge to get L large enough. A question that should be answered to determine appropriate values for L is how many times a single common key matrix CK can be used to generate different final keys K. This is addressed in the following theorem and its proof. Note that this and following theorems and proofs are provided to help a person of skill understand and use the various embodiments. However, those embodiments are not limited by the accuracy or completeness of the theorems and proofs that follow.

Let each batch contain T packets and each packet consist of n bits. Further, the common keys are used for L groups. Theorem: The upper bound $L_U$ for L to generate unique keys is given by Equation 9.

$$L_U \leq \left\lfloor \frac{\frac{T}{2} + T\log_2\left(\frac{nT}{e}\right)}{T-1} \right\rfloor = L_{UPPER}(T, n) \quad (9)$$

where the symbols $\lfloor x \rfloor$ indicate the floor function of x, i.e., the greatest integer less than or equal to x, and $L_{UPPER}$ is a function of T and n defined by Equation 9.

Proof. Clearly, L is a finite number; and, at some point, one should generate new common keys $CK_m$ (m=1, 2, . . . ) in order to assure that the final key K has the entropy requirement to achieve perfect secrecy (or, in some embodiments a certain level of practical secrecy). The total number of information bits is equal to TnL. Since uniform distribution bits in the final keys is required for perfect secrecy, the entropy for this number of final keys is equal to TnL. In the approach described herein, there are three sources of randomness denoted as common keys CK, temporary keys $\mathcal{TK}$, and random pairing $\mathcal{RP}$. The goal is to compute the entropy of the final keys by using these sources. More precisely, the joint entropy, designated H(CK;$\mathcal{TK}$;$\mathcal{RP}$) is computed. These three sources of randomness are independent of each other and therefore, their joint entropy is equal to the sum of individual entropies, as given by Equation 10a.

$$H(CK;\mathcal{TK};\mathcal{RP}) = H(CK) + H(\mathcal{TK}) + H(\mathcal{RP}) \quad (10a)$$

The first source of entropy is the common keys in matrix CK that are uniformly distributed and since there are nT bits, its entropy H(CK) is equal to nT. The second source of randomness comes from temporary keys $\mathcal{TK}$. Each time that the common keys are used, n bits are taken for the construction of the temporary key. After using the common keys L times, a total of nL bits are used, creating entropy H($\mathcal{TK}$)=nL because its distribution is uniform. The final source of randomness comes from random pairing. For the first pair, there are $$\frac{NT}{2}$$

possible choices selected uniformly. The second pair have $$\frac{NT-2}{2}$$

possible outcomes. Combining all these cases provides $$\frac{(nT)!}{2^{\frac{nT}{2}}}$$

possible outcomes of equal probability.

In order to guarantee perfect security, the entropy of the L uses of CK must be less than the entropy of the three sources, given by Equation 10b.

$$nT + nL + \log_2\left(\frac{(nT)!}{2^{\frac{nT}{2}}}\right) \geq nTL \quad (10b)$$

By utilizing Stirling's approximation for logarithm of factorials, given by Equation 10c, $$\log_2(x!) \approx x \log_2(x) - x \log_2(e) \quad (10c)$$

and solving for L, the result is Equation 9; and the theorem is proved.

A quick look at Equation 9 reveals that $L_U$ grows logarithmically with respect to the values of n and T. For example, for n=1000 and T=100, the value of $L_U$ is 15. The stored bits are 100,000 bits for $CK_0$ and 15 batches times 1000 bits (15,000 bits) for the temporary keys, a total of 115,000 bits to store 15 batches of plaintext totaling 1.5 million bits, for a ratio of stored to plaintext bits of 0.076. Being able to use a common key for only 15 batches may not be as advantageous as desired. In order to reduce the ratio of stored keys to the number of information bits, some embodiments use an iterative approach to deterministically increase the number of batches that can be encrypted using the same stored keys. In some embodiments, the randomization is deterministically generated from the random keys that are stored and the randomization does not have to be stored separately. All this leads to an extra-compact stored key set for a large number of information bits.

Suppose that a value of T is initially $T_0$. Assuming n is fixed, one can generate up to $L_0 \times T_0$ uniform and independent final vector keys $K_{il}$ (i=1 to $T_0$, l=1 to $L_0$) of length n where $L_0 = L_{UPPER}(T_0, n)$. By defining $T_1 = L_0 \times T_0$, one can create a new common key of size $nT_1$, that is used $L_1$ times, where $L_1 = L_{UPPER}(T_1, n)$. After that, the next value of T is designated $T_2 = L_1 \times T_1$. At each iteration m of this process, $L_m = L_{UPPER}(T_m, n)$; and, the next key size is based on $T_{m+1} = L_m \times T_m$. This step will result in $T_{m+1}$ uniform and independent final vector keys $K_{il}$ of length n. Continuing this procedure for M iterations, it is easy to see that Equation 11a holds.

$$T_M = (\Pi_{m=0}^{M-1} L_m) \times T_0 \quad (11a)$$

Note that in each iteration m, $L_m$ uniform temporary keys of length n are generated and CK is extended to $T_m$ groups based on deterministic combinations of the original CKs and TKs, so that the extended CK are not always statistically independent of the original CKs. These deterministic combinations are described in more detail below. For example, if the system is initialized with values n=1000 and $T_0$=100, then after four iterations, the ratio of key bits to information bits is approximately $3.6 \times 10^{-7}$ compared to 0.077 for only the original iteration, m-=0. An equation for this ratio is described below.

A ratio R of temporary and common key bits to information (plaintext) bits is derived here. In the initial iteration, m=0, there are $nT_0$ common key bits and $nL_0$ temporary key bits capable of encrypting 1.5 million plaintext bits. After the first iteration, at least $L_1$ new temporary keys are used with randomization and pairing to expand the common key $CK_0$ (e.g., from $T_0$ rows to $T_0 L_0$ rows), adding all the new temporary keys to the keys to be stored, but now sufficient to encrypt 150 million plaintext bits. This will continue for M iterations. Therefore, if all temporary keys are replaced in each iteration instead or reusing the earlier temporary keys, there are a total number of key bits given by Equation 11b $$\text{Key bits} = n \times (T_0 + \Sigma_{m=1}^M L_m) \quad (11b)$$

As explained in more detail below, no additional key bits are required because of randomization and pairing. The total number of information bits that can be encrypted is $L_m \times T_m \times n$. The value of $T_m$ is given by Equation 11a, so the total number of information (plaintext) bits is given by Equation 11c.

$$\text{Plaintext bits} = L_M \times (\Pi_{m=0}^{M-1} L_m) \times T_0 \times n = (\Pi_{m=0}^M L_m) \times T_0 \times n \quad (11c)$$

And the ratio R is given by Equation 11(d)

$$R = \frac{T_0 + \sum_{m=0}^{M} L_m}{(\prod_{m=0}^{M} L_m) \times T_0} \quad (11d)$$

Careful review of this iterative approach, makes clear that the ratio, R, of key bits to information bits approaches zero by increasing the number of iterations, M, which is equivalent to increasing the computational complexity that can be used for encrypting and ultimately decrypting. Thus, the initial CK has $nT_0$ bits total. In addition $L_0$ temporary keys are used with a total bits of n $L_0$ bits. Equation 9 gives the value for $L_0$. Then the size at each iteration is increased as described in above without increasing the size of the stored common key CK.

The results demonstrate that the original approach by Shannon was pessimistic because it relied only on randomizing the key bits. However, with faster computers that can be deployed, the bit randomization can be replaced with computational complexity through a random pairing approach such as is described next.

5. Deterministic Randomized Pairing

If stored as part of the secret key, random pairing can add as much as 1.7 million bits for the example of $T_0=100$ and n=1000. If the random pairing is changed for every iteration, clearly, this random pairing concept requires significant secret key storage that can eventually wipe out all the gains indicated by R in Equation 11d. However, one may take advantage of the computational complexity and hardware in some embodiments to deterministically generate random pairing based on a plurality of stored common keys and temporary keys indicated in Equation 8.

Starting with entropy Equation 10b, substituting $T_0$ in place of T, one derives Equation 12.

$$nL + \log_2\left(\frac{(nT_0)!}{2^{\frac{nT_0}{2}}}\right) = nT_0(L-1) \quad (12)$$

Noting that the contribution to the entropy from the term nL (e.g., <15000) is not significant relative to $nT_0$ (e.g., 100,000), it is clear that the contribution of the random pairing approach (represented by the $\log_2$ term) at initialization is approximately equal to the right hand side of Equation 12. That is, most of the entropy is provided by random pairing.

Random pairing is accomplished as follows, using a deterministic approach based on an initial set of $CK_I$ stored to use for many different plaintext sources. Any number of such stored common keys can be used. For demonstration, it is assumed that the number of different common keys stored for use by a single server for all its encryption needs is at least $L_0$, the number of batches that can be encrypted in a first iteration (m=0) for theoretical perfect secrecy using a single common key. The set is designated $S_0 = \{1, 2, 3, \ldots, L_0\}$. For $CK_I$ and $l \in S_0$, all CK in the set $S_0-\{l\}$ are concatenated, e.g., for each position in $CK_I$ there is a string of $L_0-1$ bits (e.g., 14 bits) from the CK not being used (those CK in the set indicated by $S_0-\{l\}$). This string has the correct entropy to indicate a number of different random pairings that provide perfect secrecy. Note that these CKs were formed to be statistically independent and the total number of bits in the CKs for the set $S_0-\{l\}$ is $n \times T_0 \times (L_0-1)$, which satisfies Equation 12. This string can be converted to random pairings in any manner the user wishes, such as constructing a random pairing table. For example, the bits are used to construct Table 2 of random pairings when n=2 and T=1 or 2 or 3.

TABLE 2

Example random pairings for Common Keys of size nT.

| n | T | positions | #pairings= $\frac{(nT)!}{2^{\frac{nT}{2}}}$ | pairings |
|---|---|---|---|---|
| 2 | 1 | 1, 2 | 1 | (1, 2) |
| 2 | 2 | 1, 2, 3, 4 | 6 | (1, 2), (3, 4); (1, 3), (2, 4); (1, 4), (2, 3); (2, 3), (1, 4); (2, 4), (1, 3); (3, 4), (1, 2) |
| 2 | 3 | 1, 2, 3, 4, 5, 6 | 90 | (1, 2), (3, 4), (5, 6); (1, 2), (3, 5), (4, 6); (1, 2), (3, 6), (4, 5); (1, 2), (4, 5), (3, 6); (1, 2), (4, 6), (3, 5); (1, 2), (5, 6), (3, 4); (1, 3), (2, 4), (5, 6); (1, 3), (2, 5), (4, 6); (1, 3), (2, 6), (4, 5); (1, 3), (4, 5), (2, 6); (1, 3), (4, 6), (2, 5); (1, 3), (5, 6), (2, 4); (1, 4), (2, 3), (5, 6); (1, 4), (2, 5), (3, 6); (1, 4), (2, 6), (3, 5); (1, 4), (3, 5), (2, 6); (1, 4), (3, 6), (2, 5); (1, 4), (5, 6), (2, 3); (1, 5), (2, 3), (4, 6); (1, 5), (2, 4), (3, 6); (1, 5), (2, 6), (3, 4); (1, 5), (3, 4), (2, 6); (1, 5), (3, 6), (2, 4); (1, 5), (4, 6), (2, 3); (1, 6), (2, 3), (4, 5); (1, 6), (2, 4), (3, 5); (1, 6), (2, 5), (3, 4); (1, 6), (3, 4), (2, 5); (1, 6), (3, 5), (2, 4); (1, 6), (4, 5), (2, 3); (2, 3), (1, 4), (5, 6); (2, 3), (1, 5), (4, 6); (2, 3), (1, 6), (4, 5); (2, 3), (4, 5), (1, 6); (2, 3), (4, 6), (1, 5); (2, 3), (5, 6), (1, 4); (2, 4), (1, 3), (5, 6); (2, 4), (1, 5), (3, 6); (2, 4), (1, 6), (3, 5); (2, 4), (3, 5), (1, 6); (2, 4), (3, 6), (1, 5); (2, 4), (5, 6), (1, 3); (2, 5), (1, 3), (4, 6); (2, 5), (1, 4), (3, 6); (2, 5), (1, 6), (3, 4); (2, 5), (3, 4), (1, 6); (2, 5), (3, 6), (1, 4); (2, 5), (4, 6), (1, 3); (2, 6), (1, 3), (4, 5); (2, 6), (1, 4), (3, 5); (2, 6), (1, 5), (3, 4); (2, 6), (3, 4), (1, 5); (2, 6), (3, 5), (1, 4); (2, 6), (4, 5), (1, 3); (3, 4), (1, 2), (5, 6); (3, 4), (1, 5), (2, 6); (3, 4), (1, 6), (2, 5); (3, 4), (2, 5), (1, 6); (3, 4), (2, 6), (1, 5); (3, 4), (5, 6), (1, 2); (3, 5), (1, 2), (4, 6); (3, 5), (1, 4), (2, 6); (3, 5), (1, 6), (2, 4); (3, 5), (2, 4), (1, 6); (3, 5), (2, 6), (1, 4); (3, 5), (4, 6), (1, 2); |

TABLE 2-continued

Example random pairings for Common Keys of size nT.

| n | T | positions | #pairings= $\dfrac{(nT)!}{2^{\frac{nT}{2}}}$ | pairings |
|---|---|---|---|---|
| | | | | (3, 6), (1, 2), (4, 5); (3, 6), (1, 4), (2, 5); (3, 6), (1, 5), (2, 4); |
| | | | | (3, 6), (2, 4), (1, 5); (3, 6), (2, 5), (1, 4); (3, 6), (4, 5), (1, 2); |
| | | | | (4, 5), (1, 2), (3, 6); (4, 5), (1, 3), (2, 6); (4, 5), (1, 6), (2, 3); |
| | | | | (4, 5), (2, 3), (1, 6); (4, 5), (2, 6), (1, 3); (4, 5), (3, 6), (1, 2); |
| | | | | (4, 6), (1, 2), (3, 5); (4, 6), (1, 3), (2, 5); (4, 6), (1, 5), (2, 3); |
| | | | | (4, 6), (2, 3), (1, 5); (4, 6), (2, 5), (1, 3); (4, 6), (3, 5), (1, 2); |
| | | | | (5, 6), (1, 2), (3, 4); (5, 6), (1, 3), (2, 4); (5, 6), (1, 4), (2, 3); |
| | | | | (5, 6), (2, 3), (1, 4); (5, 6), (2, 4), (1, 3); (5, 6), (3, 4), (1, 2). |

As can be seen for a stored CK of 6 random bits, 90 different pairings of those same 6 bits can be generated to provide 90 independent CKs for use in encryption by application of Equations 5a through 5e. Table 2 can be generated by a deterministic algorithm; and, thus the 90 pairings do not need to be stored at all—only the original 6 bits. An analogous process can be applied for any values of n and T.

Figure 2B:
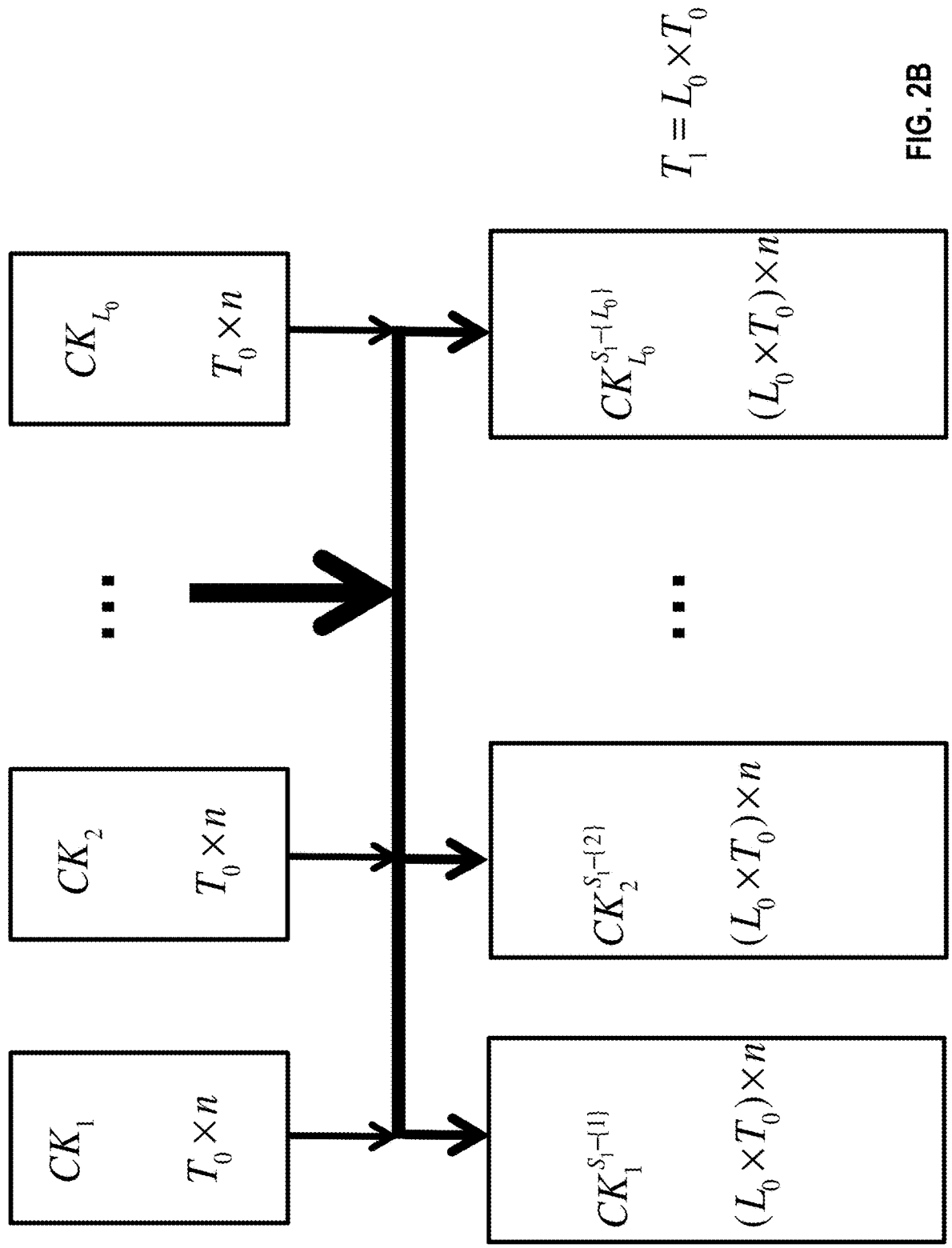
FIG. 2B is a block diagram that illustrates example construction of new random paired common keys from an original set of common keys CK for a number $L_0$ batches of a number $T_0$ packets each having a number n bits, according to an embodiment.

FIG. 2B depicts the process. FIG. 2B is a block diagram that illustrates example construction of new random paired common keys from an original set of common keys $CK_j$ for a number $L_0$ batches of a number $T_0$ packets each having a number n bits, according to an embodiment. Using this technique, the following set of new randomly paired common keys are available at the end of the first iteration:

$$CK_1^{S_0-\{1\}}, CK_2^{S_0-\{2\}}, \ldots, CK_{L_0}^{S_0-\{L_0\}}$$

where the subscript refers to the common key before random pairing and the superscript represents the sequence that is used for random pairing. The size of each $CK_j$ is $n \times T_0$, while the size of $CK_j^{S_0-\{l\}}$ is $n \times T_0 \times L_0$. $CK_j^{S_0-\{l\}}$ is constructed by using the initial $CK_j$ along with $L_0$ different and independent temporary key vectors, $TK_j$, which construction becomes the final key K after the last iteration, m=M, while the random pairing is with the help of all the $CK_{c \ne j}$ in the set $S_0-\{l\}$. Also all the new common keys $CK_j^{S_0-\{l\}}$ are statistically dependent on the original common keys and the new common keys cannot be combined in the next iteration, m=1.

In order to continue this process to increase the size of the common keys to $T_1$ rows in the next iteration, m=1, the following procedure is implemented. The new larger common keys to be generated are designated:

$$CK_{L_0+1}^{S_1-\{L_0+1\}}, CK_{L_0+2}^{S_1-\{L_0+2\}}, \ldots, CK_{2L_0}^{S_1-\{2L_0\}}$$

Construction of this set of common keys for iteration m=1 is similar to the previous process described above, except that the common keys that are used for this group belong to a set $S_1$, $S_1=\{L_0+1, L_0+2, 2L_0\}$ and, in general, a set $S_s$, s=0 to $L_1-1$, contains $S_s=\{sL_0+1, sL_0+2, \ldots, (s+1)L_0\}$. For this iteration, a total of $L_1$ sets of randomized common keys are constructed, each common key set containing $L_0$ keys, as shown below in Expression 13. Recall $L_1=L_{UPPER}(T_1,n)$, where $T_1=T_0*L_0$.

$$CK_1^{S_0-\{1\}}, \ldots, CK_{L_0}^{S_0-\{L_0\}} \quad (13)$$

$$CK_{L_0+1}^{S_1-\{L_0+1\}}, \ldots, CK_{2L_0}^{S_1-\{2L_0\}}$$

$$\ldots$$

$$CK_{(L_1-1)L_0+1}^{S_{L_1-1}-\{(L_1-1)L_0+1\}}, \ldots, CK_{(L_1)L_0}^{S_{L_1-1}-\{L_1 L_0\}}$$

Each row of this set is constructed similarly to the process described above; and, the common keys in each row are statistically dependent.

A set of indices for the starting common keys in the first column of this array is designated $S_1^1=\{1, L_0+1, 2L_0+1, \ldots, (L_1-1)L_0+1\}$. The next set of common keys of size $L_1 \times L_0 \times T_0 \times n$ in column 1 is generated from the common keys with indices in set $S_1^1$. Note that all of these original common keys are statistically independent and therefore the technique described earlier can be used. The first randomized common key is designated $CK_1^{S_0 \cup S_1^1-\{1\}}$. This key is constructed from $CK_1^{S_0-\{1\}}$ along with $L_1$ temporary keys TK. The random pairing selection is chosen by using the string of length $L_1-1$ from the set $S_1^1-\{1\}$. This set of common keys can be designated $$CK_1^{S_0 \cup S_1^1-\{1\}}, CK_{L_0+1}^{S_1 \cup S_1^1-\{L_0+1\}}, \ldots, CK_{(L_1-1)L_0+1}^{S_{L_1-1} \cup S_1^1-\{(L_1-1)L_0+1\}}$$

In this notation the superscript $S_0 \cup S_1^1-\{1\}$ for the common key means that for the first iteration, m=0, the set $S_0-\{1\}$ is used to perform random pairing, and for the next iteration, m=1, the set $S_1^1-\{1\}$ is used for random pairing.

The same procedure can be repeated for all the columns in Expression 13 to create new sets of common keys. For example, for the second column, define the set $S_2^1=\{2, L_0+2, \ldots, (L_1-1) L_0+2\}$, and by using the common keys that are statistically independent, generate the next set of common keys as $$CK_2^{S_0 \cup S_2^1-\{2\}}, CK_{L_0+2}^{S_1 \cup S_2^1-\{L_0+2\}}, \ldots, CK_{(L_1-1)L_0+2}^{S_{L_1-1} \cup S_2^1-\{(L_1-1)L_0+2\}}.$$

Thus, in this approach, initially there are $L_0$ common keys of size $nT_0$. In the first iteration, m=0, $L_0$ more randomized common keys are generated of size $nT_0L_0$. In the Mth iteration, $\Pi_{m=0}^M L_m$ common keys are generated, each one having a size of $n\{\Pi_{m=0}^{M-1} L_m \times T_0\}$ bits.

This random pairing approach suggests that it is feasible to achieve the required entropy in Equation 10a by taking advantage of the high computational complexity of available computers. Note that this result implies that in order to achieve perfect secrecy, it is not necessary to have significant number of stored key bits. Other sources of randomness can be also used in order to achieve perfect secrecy while reducing the stored secret key requirements.

In this approach, the concatenated bit string turns into a random pairing using a random pairing table. The random pairing table is a deterministic table that can be constructed as needed and not stored. This table is not part of the stored secret key and it can even be known by an eavesdropper. However, the selection of the random pairing that is based on a combination of the common keys is secret because the common keys are part of the secret. For implementation of this approach, one can uniquely determine the random pairing for a T×n matrix by using the value of RP.

Note that at the end of the Mth iteration, there will be $\Pi_{m=0}^{M} L_i$ common keys that are statistically dependent. If information bits are encrypted with these keys and are stored in a single server in the cloud, one can no longer claim that these encrypted data have perfect secrecy property. For this reason, local perfect security is defined below among the secrecy proofs. All the encrypted files that use statistically dependent keys should be stored properly, e.g., on separate devices, in order to obtain perfect local secrecy. As indicated below, tens of thousands of dependent encrypted packets can be generated. However, tens of thousands of separate devices are often available on a cloud storage system. Thus, perfect local secrecy is practical in today's computing environment.

Shannon one-time pad approach states that the ratio of the key to information bits is 1. This result is also known as the impossibility result. Here it is shown that this ratio can arbitrarily tend to zero by increasing the value of T. One important question is how this approach is able to achieve a result contrary to Shannon. Reviewing the Shannon problem formulation, it is observed that there the encryption technique is applied to a single packet. The only connection between different packets is the assumption that the keys are unique and statistically independent of each other. Therefore, for this particular problem formulation, there is only a single parameter (one degree of freedom) to work with. In contrast to Shannon's approach, here the problem is formulated as providing perfect secrecy for T packets together. Further, the same (temporary) key is used for all these T packets. Therefore, in order to provide independence between keys used for different packets, a set of T common keys is introduced. The final keys that are used for encryption, are produced as a combination of temporary and common keys. Note that these assumptions provide more than one degree of freedom which allows reuse of the common keys for many batches of packets, each consisting of T packets while providing unique and independent keys for each packet. Another interesting observation is the fact that the total key bits used for the first batch of T packets has a ratio more than 1, more than Shannon approach. In the present scheme, it is the average size of keys for encrypted packets that is significantly less than 1 and depending on how many data packets are encrypted, the ratio decreases—as described above.

6. Secrecy Achieved

This approach achieves arguably perfect secrecy with minimum key size requirements for distributed cloud storage system and other applications. This section is dedicated to the proof of perfect secrecy of the proposed protocol. Since the temporary keys are used for generation of all keys in one batch of T packets, it is useful to prove that the T keys generated for one batch of packets are statistically independent. Further, the common keys are used for many (e.g., up to $L_U$) successive batches of packets. Therefore, it is also useful to prove that two keys that are generated using the same row of matrix CK for two different batches of packets are also uniformly distributed and unique. This is proved for each bit of the vector key $K_i$.

Theorem. Any two keys generated using the same temporary key and different rows of a single common key are uniformly distributed, statistically independent and unique. They are also statistically independent of the files.

Proof. Let's define two keys that belong to the same batch of files based on Equation 4b as $$K_{i1} = [k_{(i1-1)n+1}, k_{(i1-1)n+2}, \ldots, k_{i1n}]$$

$$K_{i2} = [k_{(i2-1)n+1}, k_{(i2-1)n+2}, \ldots, k_{i2n}]$$

The jth bit of these two keys can be constructed using Equation 5a through 5b, for example. Note that the jth bits of $K_{i1}$ and $K_{i2}$ are using row i1 and row i2 r of matrix CK respectively. It is assumed in both cases Equation 5e is used. Note that all the other possibilities can be proved using similar argument. The jth element of the two keys are given by Equation 14a and Equation 14b, respectively.

$$k_{j1} = tk^j \oplus a_{j1} \tag{14a}$$

$$k_{j2} = tk^j \oplus a_{j2} \tag{14b}$$

Because $a_{j1}$ and $a_{j2}$ are randomly and uniformly distributed and they are statistically independent, therefore $k_{j1}$ and $k_{j2}$ are also statistically independent and they both have uniform distribution. Because each key has uniform distribution, its entropy has maximum possible value which guarantees perfect secrecy. Note that Crypto lemma can also be used to prove that the jth bit ($1 \le j \le n$) of any two keys $K_{i1}$ and $K_{i2}$ within one batch of T packets have uniform distribution and are statistically independent.

Lemma 1. (Crypto lemma) Let (C, +) be a compact abelian group with group operation +, and let X=M+K, where M and K are random variables over C and K is independent of M and uniform over C. Then X is independent of M and uniform over C.

In the example embodiment, one can easily see from Equation 14a and 14b that Equation 14c holds $$k_{j1} \oplus a_{j1} = k_{j2} \oplus a_{j2} \tag{14c}$$

because both equal $tk^1$. Therefore, one can write an equality of Equation 11d.

$$k_{j1} \oplus a_{j1} = a_{j2} \oplus k_{j2} \tag{14d}$$

Assuming K in the Crypto lemma is given by Equation 14e, $$K = a_{j1} \oplus a_{j2} \tag{14e}$$

then it is easy to see that the right-hand side of Equation 14e has uniform distribution. Hence, using the Crypto lemma, it can be concluded that $k_{j1}$ and $k_{j2}$ are independent with uniform distribution. Because this is true for all the bits of these two keys, it can be concluded that any two keys inside one batch of T packets are statistically independent with uniform distribution and unique.

In the method presented here, the common keys in matrix CK are used for multiple ($L_O$) batches. The next theorem proves that these keys constructed for multiple batches are also statistically independent with uniform distribution. Consider the batch B1 and the batch B2 of the $L_O$ batches using the same common keys in matrix CK. Each batch contains T packets. These two batches use different temporary keys $\mathcal{TK}_{B1}$ and $\mathcal{TK}_{B2}$ to construct vector keys $K_i$ (B1) and $K_i$ (B2) for the ith packet in each batch.

In order to prove the independence of the keys $K_i$ (B1) and $K_i$ (B2), keys that are generated for these two groups of files using the same row from matrix CK are compared. Further, it is assumed that the j 1th elements of keys k $K_i$ (B1) and $K_i$ (B2) are derived using the same condition, e.g., $\gamma_2=0$, $\gamma_1=0$, given by Equation 5e. Similar arguments can be made for the other possible conditions.

Theorem. The keys used for each batch of T packets are uniformly distributed and statistically independent of the keys generated for another batch of packets. proven here; and the proof for other possible cases follows similarly.

Proof. The key generation of encrypted packets in each batch consists of combining (by an XOR operation) two randomly uniformly distributed vectors that are statistically independent of each other and independent of the data. Therefore, using those keys will provide uniformly distributed keys and, thus, perfect secrecy.

Consider bit j1 of the key for the B1 and B2 batches using the same common key CK, as given by Equations 15a and 15b, respectively.

$$k_{j1'}(B1)=tk^j(B1) \oplus a_{j1} \quad (15a)$$

$$k_{j2}(B2)=tk^j(B2) \oplus a_{j1} \quad (15b)$$

For these two key bits, the common key $a_{j1}$ is the same in construction of the keys but they use two different temporary key bits, $tk^j$ (B1) and $tk^j$ (B2) that are statistically independent. Using similar argument as the preceding Theorem 1, and by observing the relationship of Equation 15c $$k_{j1}(B1) \oplus tk^j(B1) = k_{j1}(B2) \oplus tk^j(B2) \quad (15c)$$

because both equal $a_{j1}$; and, by transferring the temporary keys to one side of the equality, one gets Equation 15d.

$$k_{j1}(B1) \oplus tk^j(B1) \oplus tk^j(B2) = k_{j1}(B2) \quad (15d)$$

One then uses the Crypto lemma to conclude that $k_{j1}$(B1) and $k_{j1}$(B2) are statistically independent with uniform distribution.

A practical goal for secrecy of cloud storage is local perfect secrecy, defined as follows. If we encrypt all the packets with unique, and statistically independent keys within a server using XOR operation, then these encrypted packets have perfect secrecy property within that particular server.

Note that inside a data center, there are tens of thousands of servers available that are used to store data. Every time that we generate a new sets of common keys CK using m iterations, we have a total of $\Pi_{m=0}^{M} L_m$ common keys that can be used to encrypt the data. These common keys are statistically dependent and when used for encryption of data, they are advantageously stored in different servers. Therefore, after encryption of data with each common key, the encrypted data is stored in a unique server. Now when a new set of common keys are generated using M iterations, the same servers are used to store the encrypted data. Note that the new set of common keys are statistically independent of the previously created sets. There is a trade-off between the complexity and R. As the ratio of key bits to information bits R is decreased, a larger number M of iterations are used to generate common keys which requires larger number of servers that is needed to store the encrypted data. For example, if $T_0=100$; $n=5000$, a value of $R=1.6 \times 10^{-4}$ can be achieved with perfect local secrecy using 10,266 servers; while, $R=6 \times 10^{-6}$ can be achieved with perfect local smaller ratio for R is not yet practical using a single data center; but, the results show that as available computational complexity improves in the future, one can reduce the number of keys bits required to encrypt a given data while achieving perfect local secrecy. This result implies that unlike the original approach by Shannon that attempted to obtain the randomness from the key bits, it is possible to use the available computational complexity to produce the uncertainty needed in order to achieve perfect local secrecy.

If an adversary hacks encrypted data from one server, it is not possible to obtain any information from the stolen data. However, if an adversary obtains encrypted data from multiple servers, since the keys that are used for encrypting these data are (weakly) statistically dependent, it is theoretically possible to extract some information from this data while all of the generated keys have uniform distributions. However, it is important to note that the keys used in each server is from a single common key CK at the initialization and many temporary keys. The other common keys are used only for the process of random pairing and those common keys are not directly used in creation of the final keys. This unique method of key generation seems to provide a level of security that is significantly better than existing encryption techniques. Also note that even if a common key is somehow obtained, it only reveals some information about some of the encrypted files and the rest of files are secure.

In order to evaluate the computational complexity of this method when some encrypted files with correlated keys are hacked by an intruder, assume $n=5000$ and $T_0=100$. In general, without the knowledge of secret information, the number of possibilities is infinitely large and this value cannot be computed. Further assume that the value of $T_0$ and n is revealed to the intruder and $M=4$ iterations are used. Just the number of possibilities to construct one set of common keys after 4 iterations is equal to $2^{n \times (T_0 + \Sigma_{m=0}^{M} L_m)} = 2^{1165000}$ with equal probability. This number does not include the random pairing which increases the number of possibilities significantly. It is not hard to see that even with significant computational complexity, one needs to not only know the encrypted files with correlated keys, but also the intruder needs to know which encrypted files are paired together since the random pairing uses common keys from other files while in a single server, one can have many encrypted files created from many different groups of common keys. It is clear with this simple example to see that the number of possibilities in this approach is significantly more than that of any computationally secure encryption approach.

The above computation on the number of possibilities may imply that encoding of this approach is computationally expensive. As a matter of fact, in order to encode each bit, simple Equations 5a through 5e are used. In order to encode every two bits, one only computes $\gamma_{j1}, \gamma_{j2}, \gamma_1$, and $\gamma_2$ and then use Equation 5e to derive two keys and finally XOR each key with an information bit. This is equivalent of only (1+2M) XOR operations per information bit. However, the challenge is that the encoding should be carried for a large number of packets/files simultaneously since many keys are derived simultaneously. The decoding operation also involves building these large key matrices even if only a portion of the keys are used for a given file. This implies that this technique is well suited for archival data that are highly sensitive but are not decoded often. For data that requires frequent access by users, decoding becomes computationally complex because of the complicated construction of the keys. If computational complexity is available, then this approach can be used for data that are accessed frequently.

Table 3 lists the secret keys that are used in this approach for multiple different (e.g. $L_0$) plaintext sources to be encrypted.

TABLE 3

Storage for secret keys

| Description | Symbol | Size (bits) |
|---|---|---|
| Bits per packet | n | Ceiling ($Log_2(n)$) |
| Initial packets pre batch | $T_0$ | Ceiling($Log_2(T_0)$) |
| Number of iterations | M | Ceiling($Log_2(M)$) |
| Common keys at initialization (recall $L_0 = L_{UPPER}(n, T_0)$) | $CK^l$ $1 < l < L_0$ | $nT_0 \times L_0$ |
| Temporary keys for all M iterations | TK | $n \times L_M \times L_0$ |

Uniqueness of final keys is determined. In practice, each time a temporary key is selected that provides duplicate final keys, that temporary key is advantageously excluded for final key generation. One shortcoming of the proposed approach is that, in order to achieve perfect secrecy, one generates the final keys of $K_i$ which are the same size as information bits in order to make sure that the final keys are unique. This is computationally very complex and clearly is not desirable in many practical applications. A practical solution to avoid comparing all these final keys in advance with previous final keys is to have a very low upper bound on the probability of two final keys being similar. The next theorem demonstrates that one can select random unique temporary keys and with high probability (w.h.p), the ultimate final keys $K_i$ will be unique.

Theorem. Let each batch contain T packets and each packet consist of n bits. Further, the common keys are used for L batches. The final keys that are created with the iterative technique are unique with high probability (w.h.p.) at each iteration.

Proof. In order to prove this, first this is proved for the first iteration and then it is demonstrated that this is also true for each subsequent iteration. At the initialization step, common keys of size $T_0$ by n are generated. It is assumed that $T_0$ is large enough that we can approximate $T_0/(T_0-1)$ equal to 1 in order to simplify the presentation of the proof. Using this simplification in Equation 9, gives Equation 16.

$$L_0 = \left\lfloor \frac{1}{2} + \log 2\left(\frac{nT_0}{e}\right) \right\rfloor \quad (16)$$

Based on the construction of the common keys in CK, it is obvious that it is impossible for the keys in one group of files to become identical since each row of CK is a random uniform and unique vector of length n. However, after a set of $T_0$ final keys K are created for the first group of files, for the second group, it is possible one or more of $T_0$ final keys K become similar to the previous keys. The probability of having unique keys for the second group conditioning on unique keys for the first group is given by Expression 17a.

$$\frac{2^n - T_0}{2^n} \quad (17a)$$

This probability is the same for all the keys in this group. The reason is that each key generated in the second group, may be similar to one of the keys in the first group but it is impossible to be the same in its own group based on the common key construction scheme. Once the second group of keys are created, for the third group, the probability of having unique keys conditioning on the construction of unique keys in previous groups is given by Expression 17b.

$$\frac{2^n - 2T_0}{2^n} \quad (17b)$$

Finally, for batch $L_0$, the probability $Punique_0$ of having unique keys, assuming unique keys have been created for the previous $L_0-1$ batches, is given by Equation 17c.

$$Punique_0 = \frac{2^n - (L_0 - 1)T_0}{2^n} = 1 + \frac{\frac{1}{2}T_0 L_0}{2^n} - \frac{T_0 \log_2\left(\frac{nT_0 L_0}{e}\right)}{2^n} \quad (17c)$$

In the first iteration, it is easy to see that the conditional probability of having unique keys if the previous step had unique keys is upper bounded as given in Equation 17d.

$$Punique_0 \leq 1 + \frac{\frac{1}{2}T_0 L_0}{2^n} - \frac{T_0 L_0 \log_2\left(\frac{nT_0 \prod_{m=0}^{M-1} L_m}{e}\right)}{2^n} \quad (17d)$$

After M iterations, this probability can be computed as the product of all these individual probabilities. Note that as M increases, the conditional probability decreases and moves away from one. The smallest of these probabilities is the last one at the Mth iterations, given by Equation 17e.

$$Punique_M \leq \quad (17e)$$
$$1 + \frac{\frac{1}{2}T_0 \prod_{m=0}^{M-1} L_m}{2^n} - \frac{T_0 L_0 (\prod_{m=0}^{M-1} L_m) \times \log_2\left(\frac{nT_0 \prod_{m=0}^{M-1} L_m}{e}\right)}{2^n}$$

As n tends to infinity, it is clear that this conditional probability approaches 1. Therefore, the joint probability of all these final keys being unique approaches 1 with high probability; and, the theorem is proved.

This is a very strong result which makes this scheme practical and with high probability, provides perfect secrecy without any need to create and compare all final keys in advance to check for uniqueness. The fact that the ratio of key bits to information bits in this scheme is decreasing by increasing the number of iterations or equivalently, by using more computational power, is very important—especially because quantum computers are on the horizon, which are capable of providing large number of operations. This is a significant reduction in key requirements for achieving perfect secrecy.

For example, suppose that random temporary keys are generated and they are used to generate $K_i$ without checking them with previously generated final keys with a very low probability. Using the values of n=1000 and $T_0=100$, it can easily be shown that the probability of initial step having similar final keys is equal to approximately $1467/2^{1000}$. This probability can be similarly computed for all the iterations to show very low probability. Therefore, in many practical applications, the final keys $K_i$ don't have to be computed in advance and compared for uniqueness with previously generated final keys $K_i$.

Shannon one-time pad approach [1] states that the ratio of the key to information bits is 1. This result is also known as Shannon impossibility [8] result. Here it is shown that this ratio can tend to zero by increasing the encoding and decoding computational complexity. One important question how to achieve such result which seems contrary to Shannon approach. By reviewing Shannon problem formulation, it is observed that the encryption technique is applied to a single packet (file). The only connection between different packets is the assumption that the keys are unique and statistically independent of each other. Therefore, for this particular problem formulation, one only has a single parameter (one degree of freedom) to work with. Contrary to Shannon's approach, here the problem is formulated by providing perfect secrecy for multiple batches of packets together. Further, a single common key CK is used for many packets. Also, temporary keys and random pairing concepts are introduced to produce additional entropy. Unlike the Shannon approach that creates the entropy by only randomizing the bits, in the various embodiments, the entropy is created from three sources, namely, common keys, temporary keys, and random pairing of common keys to create the final keys. Interestingly, most of the entropy in these embodiments stems from random pairing which requires a significant number of bits. By using common keys from other batches of packets, this problem is overcome without using any additional bits. But this approach, while creating uniform keys, made all the final keys created in one group statistically dependent. By storing the encrypted data using these dependent keys in different machines (servers) in one or multiple data centers, perfect local secrecy was achieved for all the files that are stored in each server.

Note that by using common and temporary keys and uniquely combining them, one generates final keys K that have exactly the same size as information bits. Therefore, Shannon impossibility theorem has not been violated. Instead a smart way of creating these keys is proposed without actually requiring to store the same amount of key bits as information bits.

Another interesting observation is that current advances in computational complexity and future use of quantum computers seems to create a major challenge for computationally secure encryption techniques. The embodiments described here changed this challenge into opportunity by taking advantage of this computational complexity and availability of large amount of memory. Various embodiments use this capability to provide perfect secrecy that is even immune to the advancement of quantum computers that will be developed in the future.

7. Simulation

Figure 3:
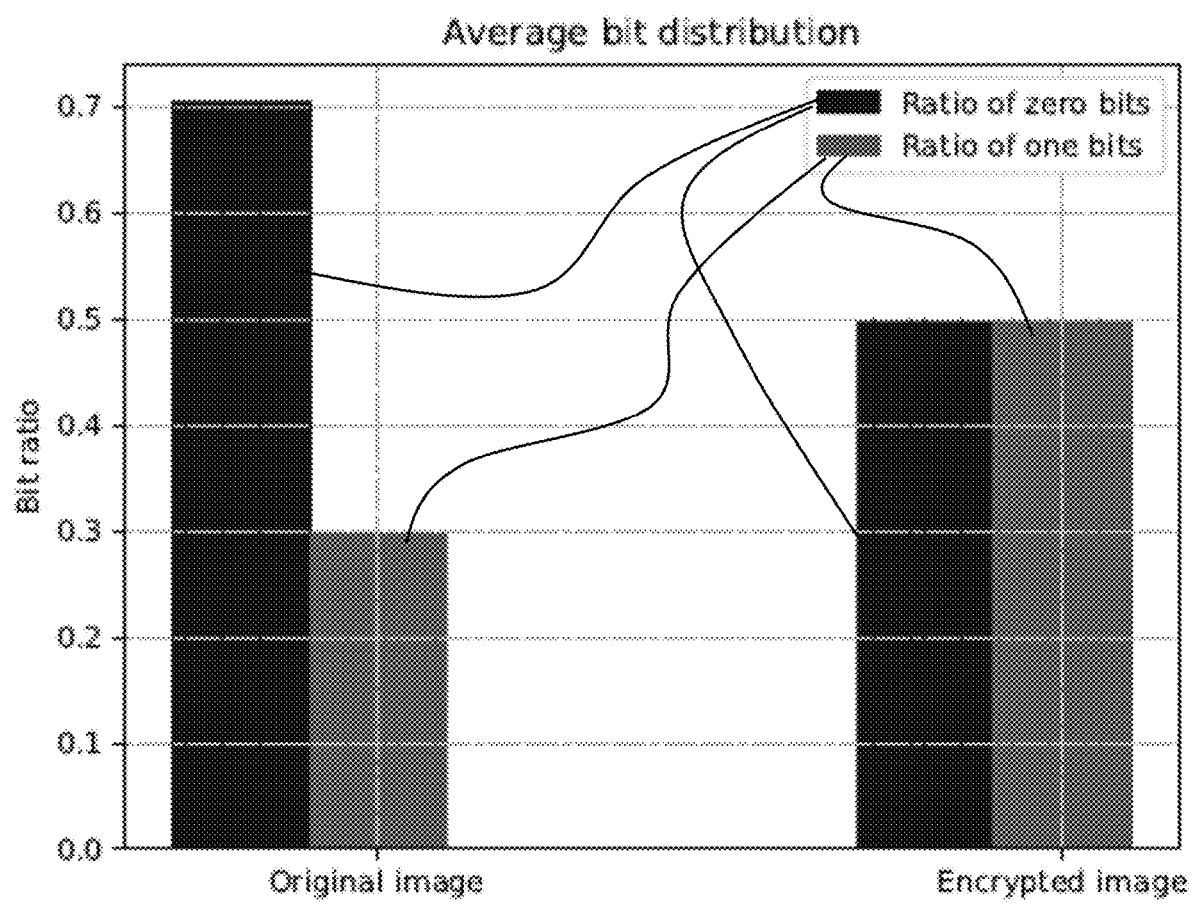
FIG. 3 is a plot that illustrates effective encryption, according to an embodiment.

FIG. 3 demonstrates the simulation results for one image packet with a size of 2.8 MB ($22.4 \times 10^6$ bits). The bar plot in the left of this figure shows the distribution of zeros and ones. For this particular example, approximately 71% of the packet includes zeros and the rest are ones. We have divided this packet into smaller packets of size 5 KB (n=40 Kbits) and T=560. After using the proposed algorithm for encryption, the right side of FIG. 3 demonstrates the bit distribution of the encrypted image. As can be seen, the bit distribution tends to uniform distribution. Note that in this technique, the probability of encrypted packets is uniformly distributed regardless of the value of packet size n. However, if the size of a packet is selected long enough, then the actual number of zeros and ones will be much closer. For example, in the illustrated embodiment, when n=40 Kbits, then the average ratio of zeros and ones are equal to 0.4999999973 and 0.5000000027, respectively. For the same example, when n=4 Kbits, the average ratio of zeros and ones after encryption is equal to 0.4999176221 and 0.5000823779 respectively. However, in both cases, the encrypted signal is perfectly secure as was proven in the previous section.

8. Computational Hardware Overview

Figure 4:
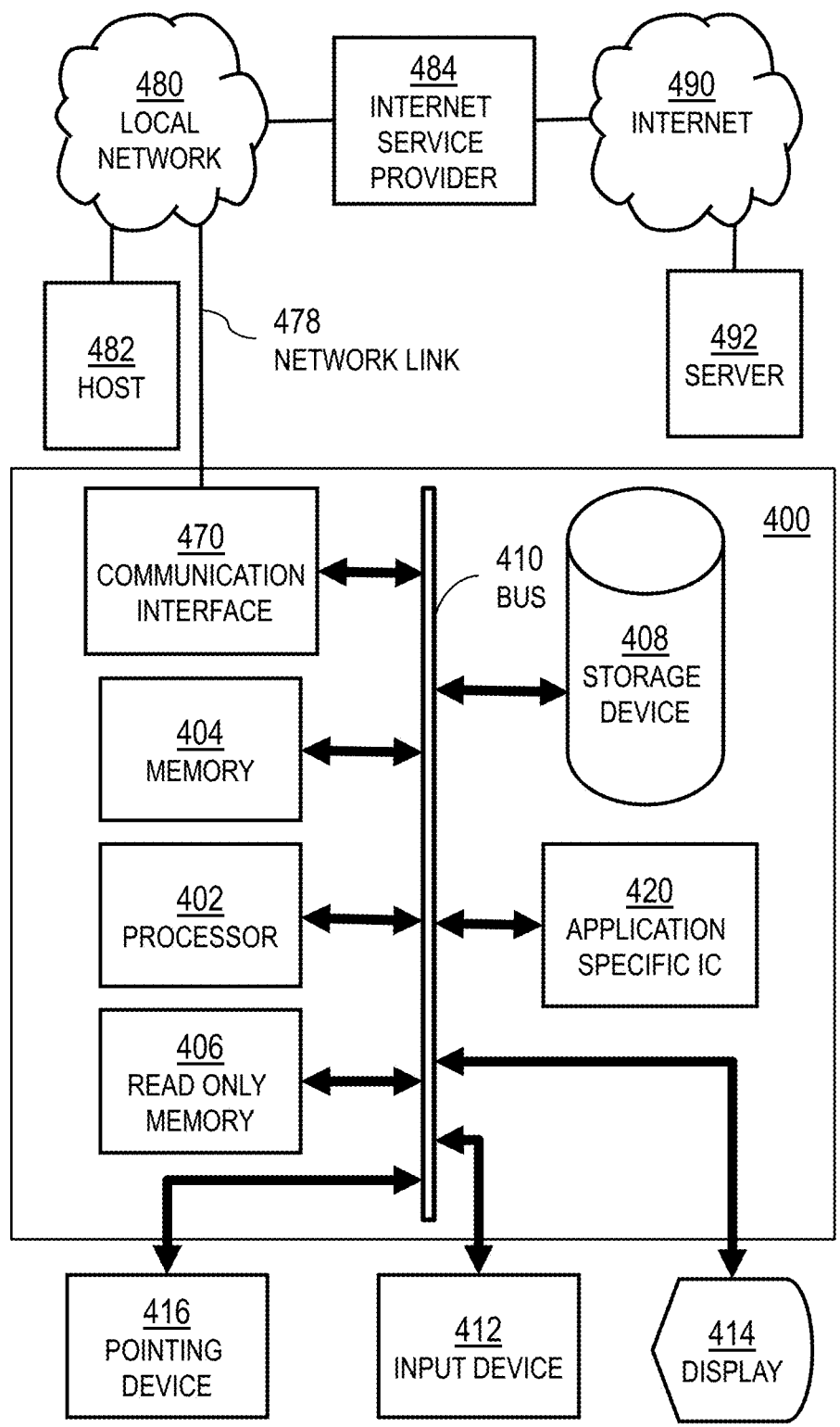
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

Figure 5:
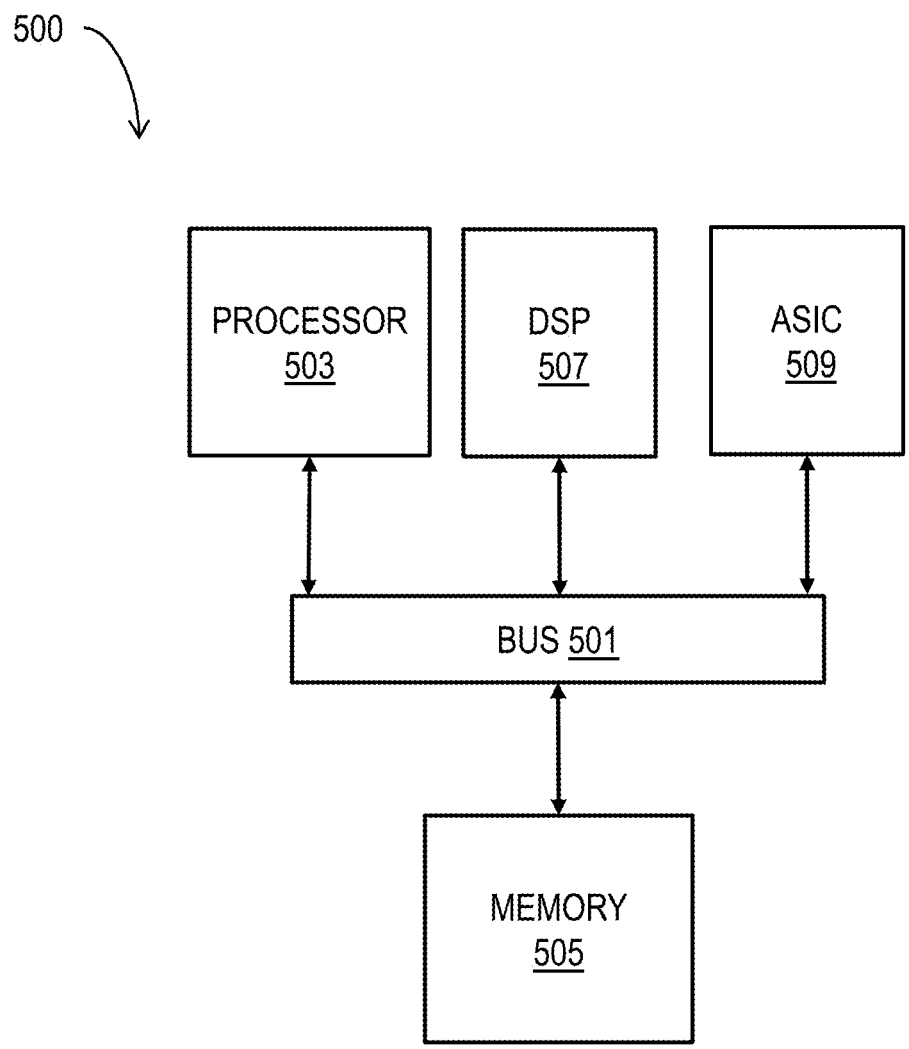
FIG. 5 illustrates a chip set upon which an embodiment of the invention may be implemented.

FIG. 5 illustrates a chip set 500 upon which an embodiment of the invention may be implemented. Chip set 500 is programmed to perform one or more steps of a method described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of a method described herein.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 505 also stores the data associated with or generated by the execution of one or more steps of the methods described herein.

Figure 6:
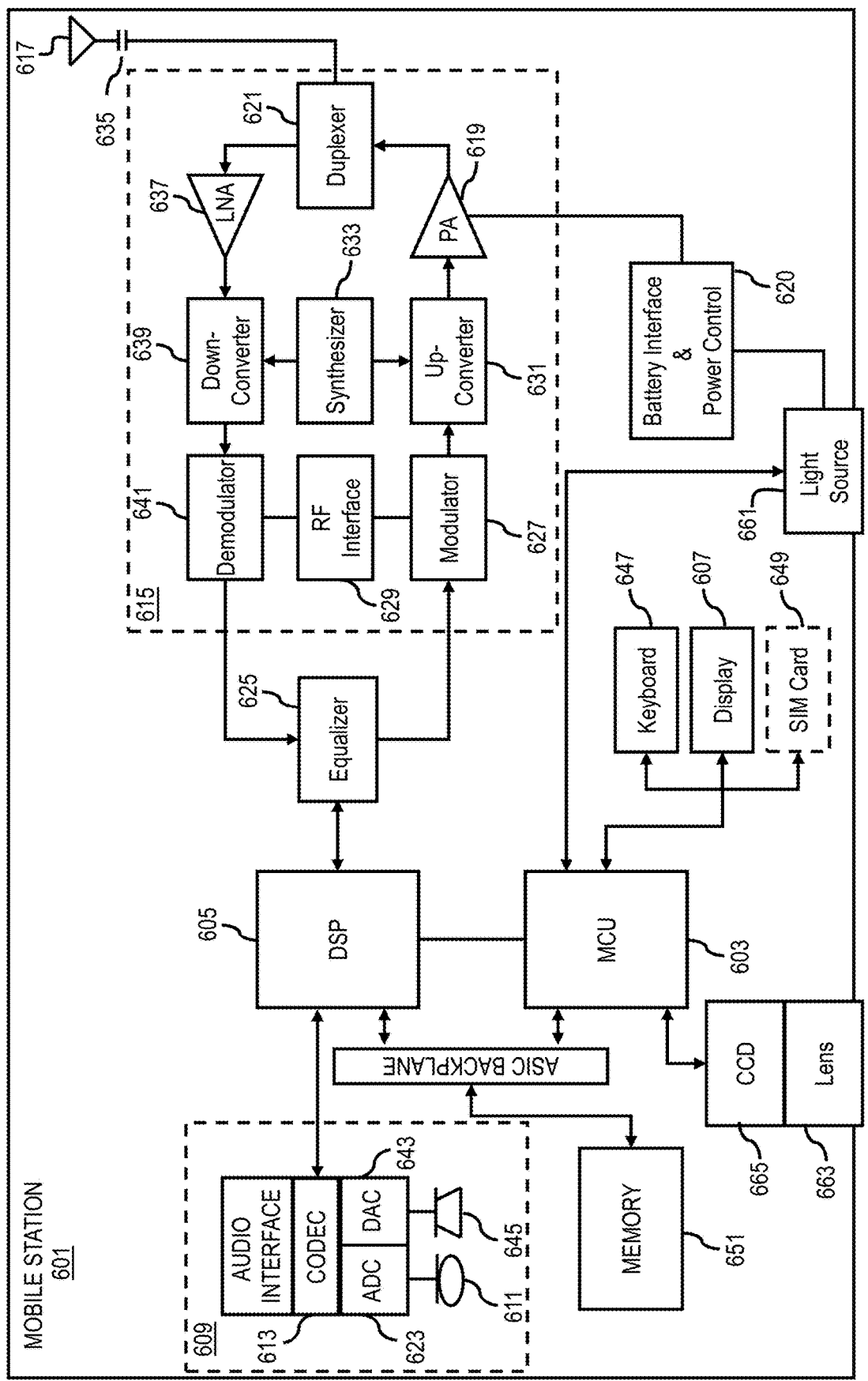
FIG. 6 is a diagram that illustrates example components of a mobile terminal (e.g., cell phone handset) for communications, which is capable of operating in the system of FIG. 1, according to one embodiment.

FIG. 6 is a diagram of exemplary components of a mobile terminal 600 (e.g., cell phone handset) for communications, which is capable of operating in the system of FIG. 1, according to one embodiment. In some embodiments, mobile terminal 601, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps as described herein. The display 607 includes display circuitry configured to display at least a portion of a user interface of the mobile terminal (e.g., mobile telephone). Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603 which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 as described herein. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

In some embodiments, the mobile terminal 601 includes a digital camera comprising an array of optical detectors, such as charge coupled device (CCD) array 665. The output of the array is image data that is transferred to the MCU for further processing or storage in the memory 651 or both. In the illustrated embodiment, the light impinges on the optical array through a lens 663, such as a pin-hole lens or a material lens made of an optical grade glass or plastic material. In the illustrated embodiment, the mobile terminal 601 includes a light source 661, such as a LED to illuminate a subject for capture by the optical array, e.g., CCD 665. The light source is powered by the battery interface and power control module 620 and controlled by the MCU 603 based on instructions stored or loaded into the MCU 603.

9. Alternatives, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

10. References

Each of the following references is hereby incorporated by reference as if fully set forth herein, except for terminology inconsistent with that used herein.

1. Claude E Shannon Communication theory of secrecy systems. Bell Labs Technical Journal, 28(4):656-715, 1949.
2. Ueli Maurer. Conditionally-perfect secrecy and a provably-secure randomized cipher. Journal of Cryptology, 5(1):53-66, 1992.
3. Stefan Dziembowski and Ueli Maurer. Tight security proofs for the bounded-storage model. In Proceedings of the thirty-fourth annual ACM symposium on Theory of computing, pages 341-350, May 2002.
4. C. Cachin and U. Maurer. Unconditional security against memory bounded adversaries. In Advances in Cryptography-Crypto, pages 292-306, 1997.
5. Yan Zong Ding and Michael 0. Rabin. Hyper-encryption and everlasting security. In Annual Symposium on Theoretical Aspects of Computer Science, pages 1-26, March 2002.
6. Mohsen Karimzadeh Kiskani, Hamid R Sadjadpour, Mohammad Reza Rahimi, and Fred Etemadieh. Low complexity secure code (LCSC) design for big data in cloud storage systems. In Communications (ICC), 2018 International Conference on. IEEE, 2018.
7. G David Forney Jr. On the role of MMSE estimation in approaching the information-theoretic limits of linear gaussian channels: Shannon meets wiener. arXiv preprint cs/0409053, 2004.
8. Yevgeniy Dodis. Shannon impossibility revisited. In International Conference on Information Theoretic Security, pages 100-110, Berlin, Heidelberg, 2012.
9. Alexandros G Dimakis, P Brighten Godfrey, Yunnan Wu, Martin J Wainwright, and Kannan Ramchandran. Network coding for distributed storage systems. IEEE Transactions on Information Theory, 56(9):4539-4551, 2010.
10. Theodoros K Dikaliotis, Alexandros G Dimakis, and Tracey Ho. Security in distributed storage systems by communicating a logarithmic number of bits. In Information Theory Proceedings (ISIT), 2010 IEEE International Symposium on, pages 1948-1952. IEEE, 2010.
11. Sameer Pawar, Salim El Rouayheb, and Kannan Ramchandran. On secure distributed data storage under repair dynamics. In Information Theory Proceedings (ISIT), 2010 IEEE International Symposium on, pages 2543-2547. IEEE, 2010.
12. Sameer Pawar, Salim El Rouayheb, and Kannan Ramchandran. Securing dynamic distributed storage systems against eavesdropping and adversarial attacks. IEEE Transactions on Information Theory, 57(10):6734-6753, 2011.
13. Sameer Pawar, Salim El Rouayheb, and Kannan Ramchandran. Securing dynamic distributed storage systems from malicious nodes. In Information Theory Proceedings (ISIT), 2011 IEEE International Symposium on, pages 1452-1456. IEEE, 2011.
14. Nihar B Shah, K V Rashmi, and P Vijay Kumar. Information-theoretically secure regenerating codes for distributed storage. In Global Telecommunications Conference (GLOBECOM 2011), 2011 IEEE, pages 1-5. IEEE, 2011.
15. Ankit Singh Rawat, Onur Ozan Koyluoglu, Natalia Silberstein, and Sriram Vishwanath. Optimal locally repairable and secure codes for distributed storage systems. IEEE Transactions on Information Theory, 60(1):212-236, 2014.
16. Alexandros G Dimakis, Vinod Prabhakaran, and Kannan Ramchandran. Distributed fountain codes for networked storage. In Acoustics, Speech and Signal Processing, 2006. ICASSP 2006 Proceedings. 2006 IEEE International Conference on, volume 5, pages V-V. IEEE, 2006.
17. Siddhartha Kumar, Eirik Rosnes, and Alexandre Graell i Amat. Secure repairable fountain codes. IEEE Communications Letters, 20(8):1491-1494, 2016.
18. Ning Cai and Raymond W Yeung. Secure network coding. In Information Theory, 2002. Proceedings. 2002 IEEE International Symposium on, page 323. IEEE, 2002.
19. Kapil Bhattad, Krishna R Narayanan, et al. Weakly secure network coding. NetCod, April, 104, 2005.
20. Swanand Kadhe and Alex Sprintson. On a weakly secure regenerating code construction for minimum storage regime. In Communication, Control, and Computing (Allerton), 2014 52nd Annual Allerton Conference on, pages 445-452. IEEE, 2014.
21. Swanand Kadhe and Alex Sprintson. Weakly secure regenerating codes for distributed storage. In Network Coding (NetCod), 2014 International Symposium on, pages 1-6. IEEE, 2014.
22. Muxi Yan, Alex Sprintson, and Igor Zelenko. Weakly secure data exchange with generalized reed solomon codes. In Information Theory (ISIT), 2014 IEEE International Symposium on, pages 1366-1370. IEEE, 2014.
23. Muxi Yan and Alex Sprintson. Algorithms for weakly secure data exchange. In Network Coding (NetCod), 2013 International Symposium on, pages 1-6. IEEE, 2013.
24. Matthieu Bloch and Joao Barros. Physical-layer security: from information theory to security engineering. Cambridge University Press, 2011.
25. Willie K Harrison and Steven W McLaughlin. Physical-layer security: Combining error control coding and cryptography. In Communications, 2009. ICC'09. IEEE International Conference on, pages 1-5. IEEE, 2009.
26. Byung-Jae Kwak, Nah-Oak Song, Bumsoo Park, Demijan Klinc, and Steven W McLaughlin Physical layer security with yarg code. In Emerging Network Intelligence, 2009 First International Conference on, pages 43-48. IEEE, 2009.
27. Mohsen Karimzadeh Kiskani and Hamid R Sadjadpour. Secure coded caching in wireless ad hoc networks. In Computing, Networking and Communications (ICNC), 2017 International Conference on, pages 387-391. IEEE, 2017.
28. Mohsen Karimzadeh Kiskani and Hamid R Sadjadpour. Throughput analysis of decentralized coded content caching in cellular networks. IEEE Transactions on Wireless Communications, 16(1):663-672, 2017.
29. Mohsen Karimzadeh Kiskani and Hamid R Sadjadpour. A secure approach for caching contents in wireless ad hoc networks. IEEE Transactions on Vehicular Technology, 66(11):10249-10258, 2017.
30. Mohsen Karimzadeh Kiskani and Hamid R Sadjadpour. Secure and private cloud storage systems with random linear fountain codes. In Cloud and Big Data Computing (CBDCOM), 2017 International Conference on. IEEE, 2017.
31. Sadjadpour et al. "Compact Key Encoding of Data for Public Exposure such as Cloud Storage" 25 Apr. 2018 U.S. provisional patent application 62/662,557 and 6 Sep. 2018, U.S. provisional patent application No. 62/727,636.

What is claimed is:

1. A method implemented on a hardware processor for secure remote digital storage, the method comprising:
   a. extracting first digital data comprising one or more batches, each batch comprising a plurality of no more than a number T of packets, each packet containing a plurality of a number n of bits;
   b. generating a random binary matrix CK consisting of T rows and n columns;
   c. for a first batch of the batches, generating a first random n-bit temporary key and randomizing positions of the nT elements of matrix CK to produce randomized matrix CK(RP);
   d. for a first packet in the first batch,
      generating a first packet vector key based on non-overlapping pairs of bit positions for both the temporary key and for a first packet-corresponding row of randomized matrix CK(RP),
      generating a first encrypted packet based on the first packet and the first packet vector key, and
      causing the first encrypted packet to be exposed publicly; and
   e. repeating steps c and d for all batches in one or more iterations m while batches remain for remote digital storage, wherein for an initial iteration m=0, $T_0$=T and $CK_0$=CK, after $L_m$ batches for which $L_m$ is depending on a predetermined level of desired security, then:
      increasing $T_m$ to $T_{m+1}$>$T_m$;
      expanding $CK_m$ to $CK_{m+1}$ with $T_{m+1}$ rows;
      repeating steps c and d for up to a next $L_{m+1}$ batches for which the predetermined level of desired security is maintained while batches remain for remote digital storage; and
      incrementing iteration m,
      wherein,
         $T_{m+1}$ is based on $T_m$ and $L_m$,
         $L_{m+1}$ is based on $T_{m+1}$,
         $L_{m+1}$>$L_m$, and
         $CK_{m+1}$ is deterministically based on previous iterations of CK so that a stored extra-compact key need not include the $CK_m$ for non-zero m.

2. The method as recited in claim 1, further comprising performing step d for all packets of the plurality of packets in the first batch.

3. The method as recited in claim 2, further comprising storing on a computer readable medium, on a secure device, key data that indicates the matrix CK and the randomizing positions of the nT elements and the temporary key for all packets in the first batch.

4. The method as recited in claim 1, further comprising performing steps c and d for all batches of the one or more batches.

5. The method as recited in claim 1, further comprising storing in a computer readable medium, on a secure device, key data that indicates the matrix CK and the first temporary key and the randomizing positions of the nT elements.

6. The method as recited in claim 5, further comprising decoding the encrypted packet based on the key data.

7. The method as recited in claim 1, wherein the hardware processor is a local device with physical security and causing the first encrypted packet to be exposed publicly further comprises storing the first encrypted packet at a remote device without physical security.

8. The method as recited in claim 1, wherein the pairs of bit positions are produced separately for each packet of the plurality of packets in each batch of the one or more batches.

9. The method as recited in claim 1, wherein the randomizing positions of the nT elements are produced separately for each batch of the one or more batches.

10. A non-transitory computer-readable medium carrying one or more sequences of instructions for secure remote digital storage, wherein execution of the one or more sequences of instructions by one or more processors causes the one or more processors to perform the steps of:
   a. extracting first digital data comprising one or more batches, each batch comprising a plurality of no more than a number T of packets, each packet containing a plurality of a number n of bits;
   b. generating a random binary matrix CK consisting of T rows and n columns;
   c. for a first batch of the batches, generating a first random n-bit temporary key and randomizing positions of the nT elements of matrix CK to produce randomized matrix CK(RP);
   d. for a first packet in the first batch,
      generating a first packet vector key based on non-overlapping pairs of bit positions for both the temporary key and for a first packet-corresponding row of randomized matrix CK(RP),
      generating a first encrypted packet based on the first packet and the first packet vector key, and
      causing the first encrypted packet to be exposed publicly; and
   e. repeating steps c and d for all batches in one or more iterations m while batches remain for remote digital storage, wherein for an initial iteration m=0, $T_0$=T and $CK_0$=CK, after $L_m$ batches for which $L_m$ is depending on a predetermined level of desired security, then:
      increasing $T_m$ to $T_{m+1}$>$T_m$;
      expanding $CK_m$ to $CK_{m+1}$ with $T_{m+1}$ rows;
      repeating steps c and d for up to a next $L_{m+1}$ batches for which the predetermined level of desired security is maintained while batches remain for remote digital storage; and
      incrementing iteration m,
      wherein,
         $T_{m+1}$ is based on $T_m$ and $L_m$,
         $L_{m+1}$ is based on $T_{m+1}$,
         $L_{m+1}$>$L_m$, and
         $CK_{m+1}$ is deterministically based on previous iterations of CK so that a stored extra-compact key need not include the $CK_m$ for non-zero m.

11. The computer-readable medium as recited in claim 10, wherein execution of the one or more sequences of instructions causes the one or more processors to perform step d for all packets of the plurality of packets in the first batch.

12. The computer-readable medium as recited in claim 10, wherein the pairs of bit positions are produced separately for each packet of the plurality of packets in each batch of the one or more batches.

13. The computer-readable medium as recited in claim 10, wherein the randomizing positions of the nT elements are produced separately for each batch of the one or more batches.

14. A system for secure remote digital storage comprising:
   at least one processor; and
   at least one memory including one or more sequences of instructions,
      the at least one memory and the one or more sequences of instructions being configured to, with the at least one processor, cause the system to perform at least the following, a. extracting first digital data comprising one or more batches, each batch comprising a plurality of no more than a number T of packets, each packet containing a plurality of a number n of bits;
b. generating a random binary matrix CK consisting of T rows and n columns;
c. for a first batch of the batches, generating a first random n-bit temporary key and randomizing positions of the nT elements of matrix CK to produce randomized matrix CK(RP);
d. for a first packet in the first batch,
generating a first packet vector key based on non-overlapping pairs of bit positions for both the temporary key and for a first packet-corresponding row of randomized matrix CK(RP),
generating a first encrypted packet based on the first packet and the first packet vector key, and causing the first encrypted packet to be exposed publicly; and
e. repeating steps c and d for all batches in one or more iterations m while batches remain for remote digital storage, wherein for an initial iteration m=0, $T_0=T$ and $CK_0=CK$, after $L_m$ batches for which $L_m$ is depending on a predetermined level of desired security, then:
increasing $T_m$ to $T_{m+1}>T_m$;
expanding $CK_m$ to $CK_{m+1}$ with $T_{m+1}$ rows;
repeating steps c and d for up to a next $L_{m+1}$ batches for which the predetermined level of desired security is maintained while batches remain for remote digital storage; and
incrementing iteration m,
wherein,
$T_{m+1}$ is based on $T_m$ and $L_m$,
$L_{m+1}$ is based on $T_{m+1}$,
$L_{m+1}>L_m$, and
$CK_{m+1}$ is deterministically based on previous iterations of CK so that a stored extra-compact key need not include the $CK_m$ for non-zero m.

15. The system as recited in claim 14, wherein execution of the one or more sequences of instructions causes the one or more processors to perform step d for all packets of the plurality of packets in the first batch.

16. The system as recited in claim 14, wherein the pairs of bit positions are produced separately for each packet of the plurality of packets in each batch of the one or more batches.

17. The system as recited in claim 14, wherein the randomizing positions of the nT elements are produced separately for each batch of the one or more batches.

* * * * *